(12) United States Patent
Kulasooriya et al.

(10) Patent No.: US 10,740,739 B2
(45) Date of Patent: Aug. 11, 2020

(54) FACILITATING ONLINE TO OFFLINE COMMERCE

(71) Applicant: CAKE CORPORATION, Redwood City, CA (US)

(72) Inventors: Pasan Manisha Kulasooriya, Woodside, CA (US); James Boyd O'Connor, San Francisco, CA (US); Jorn Wossner, San Francisco, CA (US); Shanil Fernando, Colombo (LK); Kevin En-Kai Wu, San Francisco, CA (US); Paul G. Kelaita, San Mateo, CA (US); Sadeesha Gamhewa, San Francisco, CA (US); Chetan Narsude, Sunnyvale, CA (US)

(73) Assignee: CAKE CORPORATION, Redwood City, CA (US)

( * ) Notice: Subject to any disclaimer, the term of this patent is extended or adjusted under 35 U.S.C. 154(b) by 590 days.

(21) Appl. No.: 14/732,426

(22) Filed: Jun. 5, 2015

(65) Prior Publication Data
US 2015/0379496 A1 Dec. 31, 2015

Related U.S. Application Data

(63) Continuation of application No. 13/396,462, filed on Feb. 14, 2012, now Pat. No. 9,082,101.
(Continued)

(51) Int. Cl.
*G06Q 20/20* (2012.01)
*G06Q 30/02* (2012.01)
(Continued)

(52) U.S. Cl.
CPC ......... *G06Q 20/202* (2013.01); *G06Q 10/087* (2013.01); *G06Q 20/322* (2013.01);
(Continued)

(58) Field of Classification Search
CPC .. G06Q 10/087; G06Q 20/202; G06Q 20/322; G06Q 30/02; G06Q 30/0201;
(Continued)

(56) References Cited

U.S. PATENT DOCUMENTS

| | | | |
|---|---|---|---|
| 6,055,573 A | 4/2000 | Gardenswartz | |
| 6,076,068 A | 6/2000 | DeLapa | |

(Continued)

FOREIGN PATENT DOCUMENTS

| | | | |
|---|---|---|---|
| JP | 2009526329 A | 7/2009 | |
| KR | 100349779 B1 | 8/2002 | |

(Continued)

OTHER PUBLICATIONS

Manouchehr Tabatabaei, Online Shopping Perceptions of Offline Shoppers, 2009 (Year: 2009).*

(Continued)

*Primary Examiner* — Tarek Elchanti
(74) *Attorney, Agent, or Firm* — Perkins Coie LLP

(57) ABSTRACT

Systems and methods for facilitating online to offline commerce are disclosed. In one embodiment, a system configured to receive a request to check-in a customer at a merchant facility is disclosed. The system receives a request to access real-time pre-sale transaction data associated with a first customer and transmits the real-time pre-sale transaction data associated with the first customer to a mobile client device. The request to check-in and the request to access the real-time pre-sale transaction data are transmitted by the first mobile client device. The system is configured to authenticate the request to check-in at the merchant facility, process the request to access the real-time pre-sale transaction data, and responsively access the real-time pre-sale transaction data associated with the first customer from a point of sale device located at the merchant facility.

16 Claims, 36 Drawing Sheets

Related U.S. Application Data

(60) Provisional application No. 61/444,609, filed on Feb. 18, 2011.

(51) Int. Cl.
    *H04L 12/26* (2006.01)
    *G06Q 10/08* (2012.01)
    *G06Q 20/32* (2012.01)
    *G06Q 30/06* (2012.01)
    *G06Q 50/00* (2012.01)

(52) U.S. Cl.
    CPC .......... *G06Q 30/02* (2013.01); *G06Q 30/0201* (2013.01); *G06Q 30/0223* (2013.01); *G06Q 30/0253* (2013.01); *G06Q 30/0635* (2013.01); *G06Q 50/01* (2013.01); *H04L 43/06* (2013.01)

(58) Field of Classification Search
    CPC ........... G06Q 30/0223; G06Q 30/0253; G06Q 30/0635; G06Q 50/01; H04L 43/06
    USPC ........................ 705/14.49, 39, 7.29
    See application file for complete search history.

(56) References Cited

U.S. PATENT DOCUMENTS

| | | | |
|---|---|---|---|
| 6,298,330 B1 | 10/2001 | Gardenswartz et al. | |
| 7,072,848 B2 | 7/2006 | Boyd et al. | |
| 7,236,942 B1 | 6/2007 | Walker et al. | |
| 7,720,708 B1 | 5/2010 | Elkins, II et al. | |
| 7,873,573 B2 * | 1/2011 | Realini | G06Q 20/04 235/379 |
| 7,877,346 B2 | 1/2011 | Karty et al. | |
| 8,015,081 B1 | 9/2011 | Franco | |
| 8,260,725 B2 | 9/2012 | Crawford | |
| 8,639,567 B2 | 1/2014 | Winters | |
| 9,082,101 B2 | 7/2015 | Kulasooriya et al. | |
| 9,466,055 B2 | 10/2016 | Kulasooriya et al. | |
| 2001/0034775 A1 | 10/2001 | Minowa | |
| 2002/0123930 A1 | 9/2002 | Boyd et al. | |
| 2005/0246245 A1 | 11/2005 | Satchell et al. | |
| 2006/0122881 A1 | 6/2006 | Walker et al. | |
| 2007/0124216 A1 | 5/2007 | Lucas | |
| 2007/0288312 A1 | 12/2007 | Wang | |
| 2008/0154654 A1 | 6/2008 | Niessen et al. | |
| 2009/0132365 A1 | 5/2009 | Gruenhagen et al. | |
| 2009/0171853 A1 | 7/2009 | Georgiou et al. | |
| 2009/0192928 A1 | 7/2009 | Abifaker | |
| 2010/0131876 A1 | 5/2010 | McGuire et al. | |
| 2010/0324978 A1 | 12/2010 | Redmann et al. | |
| 2011/0035278 A1 * | 2/2011 | Fordyce, III | G06Q 20/10 705/14.49 |
| 2011/0035288 A1 | 2/2011 | Clyne | |
| 2011/0087550 A1 | 4/2011 | Fordyce, III et al. | |
| 2011/0125565 A1 | 5/2011 | MacIlwaine et al. | |
| 2011/0125566 A1 | 5/2011 | McLaughlin et al. | |
| 2011/0196926 A1 | 8/2011 | Crawford et al. | |
| 2011/0231225 A1 | 9/2011 | Winters et al. | |
| 2011/0231243 A1 | 9/2011 | Bhatia et al. | |
| 2011/0231246 A1 | 9/2011 | Bhatia et al. | |
| 2011/0313874 A1 | 12/2011 | Hardie et al. | |
| 2012/0047014 A1 | 2/2012 | Smadja et al. | |
| 2012/0158589 A1 | 6/2012 | Katzin et al. | |
| 2012/0215584 A1 | 8/2012 | Narsude et al. | |
| 2013/0144701 A1 | 6/2013 | Kulasooriya et al. | |
| 2013/0238431 A1 | 9/2013 | Kulasooriya et al. | |
| 2014/0330686 A1 | 11/2014 | Kulasooriya et al. | |
| 2017/0098263 A1 * | 4/2017 | Priebatsch | H04W 4/21 |

FOREIGN PATENT DOCUMENTS

| | | | |
|---|---|---|---|
| KR | 100448573 B1 | 9/2004 | |
| WO | WO-2004086190 A2 * | 10/2004 | G06Q 20/02 |

OTHER PUBLICATIONS

Final Office Action dated Apr. 22, 2015, for U.S. Appl. No. 13/228,290, by Narsude et al., filed Sep. 8, 2011.
Final Office Action dated Feb. 24, 2015, for U.S. Appl. No. 14/335,573 of Kulasooriya et al., filed Jul. 18, 2014.
Final Office Action dated Nov. 6, 2013, for U.S. Appl. No. 13/228,290, by Narsude et al., filed Sep. 8, 2011.
Final Office Action dated Nov. 7, 2014, for U.S. Appl. No. 13/396,462 of Kulasooriya et al., filed Feb. 14, 2012.
International Search Report and Written Opinion dated Sep. 26, 2012, for International Application No. PCT/US2012/025636, filed Feb. 17, 2012.
Non-Final Final Office Action dated May 15, 2013, for U.S. Appl. No. 13/228,290, by Narsude et al., filed Sep. 8, 2011.
Non-Final Office Action dated Apr. 11, 2014, for U.S. Appl. No. 13/396,462 of Kulasooriya et al., filed Feb. 14, 2012.
Non-Final Office Action dated Jan. 29, 2015, for U.S. Appl. No. 13/867,839 of Kulasooriya et al., filed Apr. 22, 2013.
Non-Final Office Action dated Oct. 1, 2014, for U.S. Appl. No. 13/228,290, by Narsude et al., filed Sep. 8, 2011.
Non-Final Office Action dated Oct. 24, 2014, for U.S. Appl. No. 14/335,573 of Kulasooriya et al., filed Jul. 18, 2014.
Notice of Allowance dated Mar. 6, 2015, for U.S. Appl. No. 13/396,462 of Kulasooriya et al., filed Feb. 14, 2012.
Restriction Requirement dated Mar. 21, 2013, for U.S. Appl. No. 13/228,290, by Narsude et al., filed Sep. 8, 2011.
U.S. Appl. No. 13/228,290 of Narsude et al., filed Sep. 8, 2011.
U.S. Appl. No. 13/396,462 of Kulasooriya et al., filed Feb. 14, 2012.
U.S. Appl. No. 13/867,839 of Narsude et al., filed Apr. 22, 2013.
U.S. Appl. No. 14/335,573 of Kulasooriya et al., filed Jul. 18, 2014.
Restriction Requirement dated Sep. 23, 2015 of Kulasooriya, P.M., et al., filed Jul. 18, 2014.
Non-Final Office Action dated Dec. 3, 2015, for U.S. Appl. No. 13/228,290, by Narsude et al., filed Sep. 8, 2011.
Kowitz, B., et al. "Gather: Design for Impromptu Activity Support Utilizing Social Networks." 2005, 14 pages.
Non-Final Office Action dated Jan. 6, 2016 in Co-pending U.S. Appl. No. 14/335,573 of Kulasooriya, P.M., et al., filed Jul. 18, 2014.
U.S. Appl. No. 61/423,588 of Katzin et al., filed Dec. 15, 2010.
U.S. Appl. No. 61/423,588 of Katzin, E., filed Dec. 15, 2010.
European Extended Search Report dated Jun. 3, 2016, for European Patent Application No. 12746792.6, 7 pages.
Final Office Action dated Jun. 17, 2016 of U.S. Appl. No. 13/228,290 by Narsude, C., et al., filed Sep. 8, 2011.
Notice of Allowance dated Jun. 22, 2016, for U.S. Appl. No. 14/335,573 of Kulasooriya et al., filed Jul. 18, 2014.
Final Office Action dated Jul. 10, 2015, for U.S. Appl. No. 13/867,839 of Kulasooriya et al., filed Apr. 22, 2013.

\* cited by examiner

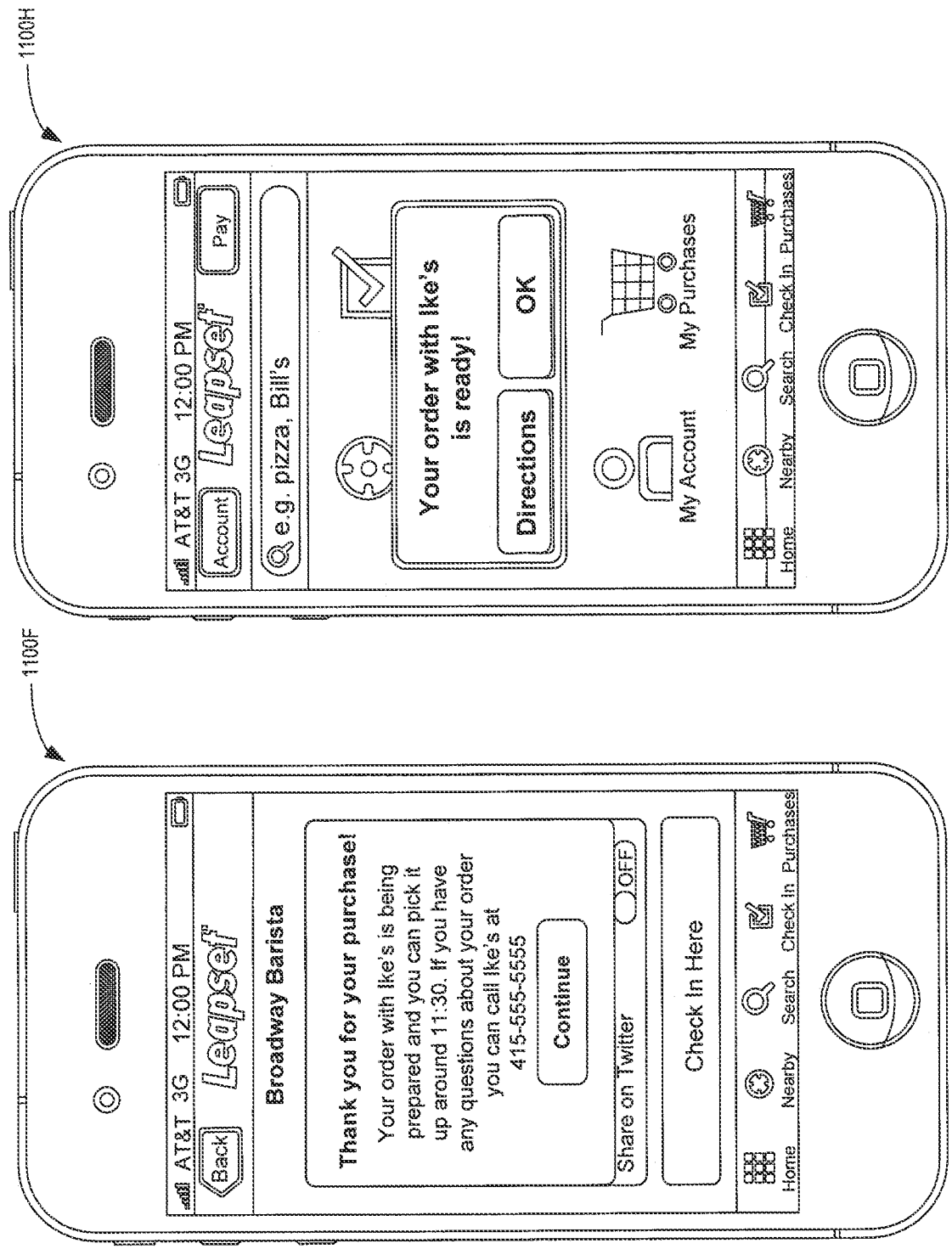

ORDERS — HI DAVE C. [SIGN OUT]

| Pending Orders | Open Orders | | | | |
|---|---|---|---|---|---|
| Created | Order | Type | Customer | ETA | Amount |
| 8/27/11 8:15PM | 123456 | Online | Jonathan Williams | 9:00PM | $27.50 |
| 8/27/11 8:18PM | 126756 | Online | Laura Brooks | 9:03PM | $17.12 |
| 8/27/11 8:22PM | 563421 | Online | Rex Grossman | 9:08PM | $37.80 |
| 8/27/11 8:26PM | 12655 | Online | Eric Greensmith, J... | 9:13PM | $25.97 |
| 8/27/11 8:30PM | 167578 | Pickup | Mark Smith | 9:00PM | $22.54 |
| 8/27/11 8:15PM | 114809 | Table 1 | Angela Cason, Joh... | 9:00PM | $17.25 |
| 8/27/11 8:15PM | 123456 | Pickup | Paul Blart | 9:00PM | $27.50 |

Order Preview — 563421

Order Type: Delivery
Delivery Time: ASAP
Order time: 8/27/11 8:22PM
Customer: Rex Grossman
Address: 2010 Broadway St
Redwood City, CA 94063
Phone: (650) 555-5555
Email: rexgross11@gmail.com

| QTY | Item | | Amount |
|---|---|---|---|
| 2 | Green Salads | | $12.00 |
|  | Extra Large, tomatoes, cucumber, rubarb | | |
| 2 | Spiffy Tiffys | | $17.96 |
|  | Chicken Breast Pesto, Mushrooms, Avacado, Pepper Jack | | |

Special instructions: One of the Spiffy Tiffys should not have avacado

Subtotal $29.96
Tax $2.84
Tip $5
Total $37.80

Order has been paid

[EDIT] [ORDER READY]
[DELETE] [PRINT]

[JUMP TO ∧] [NEW ORDER] | PENDING 4 | OPEN 7

FACILITATING ONLINE TO OFFLINE COMMERCE

CLAIM OF PRIORITY

This application is a continuation of U.S. Nonprovisional patent application Ser. No. 13/396,462, entitled "FACILITATING ONLINE TO OFFLINE COMMERCE" and filed on Feb. 14, 2012, now U.S. Pat. No. 9,082,101, issued on July 14, 2015, which claims priority from U.S. Provisional Patent Application No. 61/444,609, entitled "METHOD, SYSTEM AND APPARATUS FOR FACILITATING ONLINE TO OFFLINE COMMERCE" and filed on Feb. 18, 2011. The contents of the above-identified applications are incorporated herein by reference in their entirety.

TECHNICAL FIELD

The present disclosure generally relates to the field of commerce management and analytics, and in particular, relates to systems, methods, and a machine readable medium for facilitating online to offline commerce.

BACKGROUND

Businesses like Groupon® and OpenTable® have become increasing popular in recent years. These companies generally facilitate online to offline commerce transactions. However, to date, these businesses and others like them have focused almost entirely on the consumer and not the merchant. Accordingly, the current nature of consumer titled offerings provides modest economic upside for merchants with ever increasing complexity.

SUMMARY

Systems and methods for facilitating online to offline commerce are disclosed. In one embodiment, a system configured to receive a request to check-in a customer at a merchant facility is disclosed. The system receives a request to access real-time pre-sale transaction data associated with a first customer and transmits the real-time pre-sale transaction data associated with the first customer to a mobile client device. The request to check-in and the request to access the real-time pre-sale transaction data are transmitted by the first mobile client device. The system is configured to authenticate the request to check-in at the merchant facility, process the request to access the real-time pre-sale transaction data, and responsively access the real-time pre-sale transaction data associated with the first customer from a point of sale device located at the merchant facility.

BRIEF DESCRIPTION OF THE DRAWINGS

FIGS. 10A-10C depict example user interfaces illustrating the process of operating a point of sale device.

FIGS. 11A-11H depict example user interfaces illustrating the process of online ordering from the perspective of a mobile client device and a point of sale device.

FIGS. 12A-12J depict example user interfaces illustrating the process of checking in via the in-store experience from the perspective of a mobile client device and a point of sale device.

FIGS. 13A-13E depict example user interfaces illustrating the process of social online ordering from the perspective of the mobile client devices and a point of sale device.

FIG. 15 depicts an example user interfaces illustrating the process of offline (in-store) ordering from the perspective of the merchant mobile devices.

DETAILED DESCRIPTION

Figure 1:
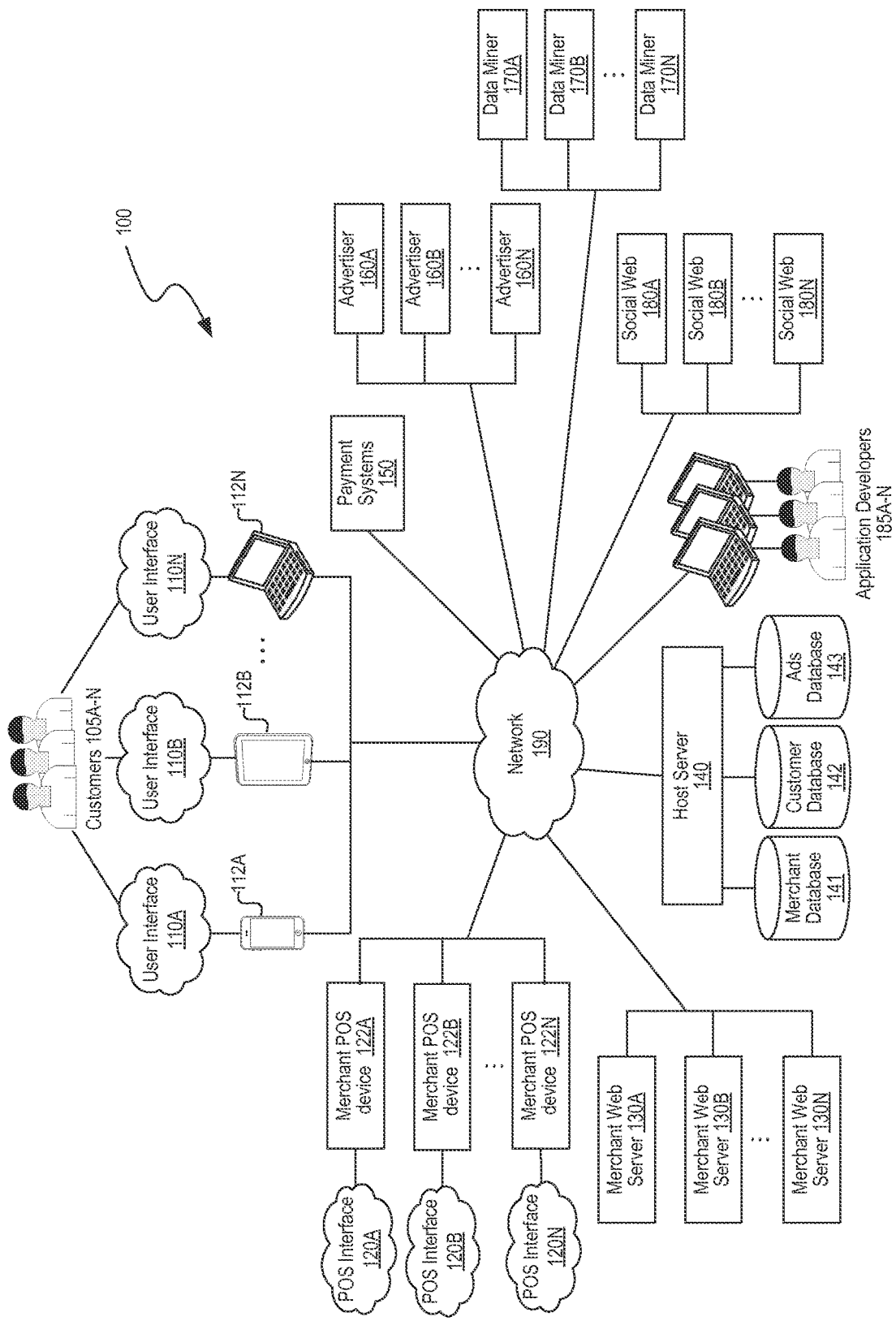
FIG. 1 depicts a block diagram of an online environment suitable for facilitating online to offline commerce.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems, methods, and a machine readable medium for facilitating online to offline commerce. In one embodiment, a management system and/or a point of sale device, together or separately, facilitate online to offline commerce by determining one or more user-specific advertisements to electronically deliver to one or more users. The one or more user-specific advertisements may be designed, for example, to reduce perishable inventory.

In one embodiment, a customer patronizing a merchant and located at the merchant's point of sale or facility can essentially access the merchants system in order to modify and/or pay for goods or services via a remote management system. For example, a customer can access and view an itemized pre-sale transaction data (e.g., itemized pre-bill for goods and/or services) by logging into a remote management system using a mobile client device (e.g., a smartphone). In order to facilitate this online to offline commerce, the remote management system is in communication with a point of sale device located at the merchant facility. The customer can then modify (e.g., buy goods and/or services) and/or pay for goods and/or services using the mobile client device.

In one embodiment, a remote customer (e.g., a user not located at the merchant facility) can log into the management system and access a point of sale device located at the customer facility in order to modify and/or pay for goods and/or services for a local customer. To begin, the remote customer may be notified or otherwise identify the location of the local customer. For example, the local customer may check in at a bar or restaurant via the management system described herein. The management system may then distribute the check-in information to various social networking servers (i.e., Facebook, Twitter, etc.). In this example, the remote customer (e.g., social network friend) identifies that the local customer just checked in at the bar or restaurant by viewing his or her social news feed (e.g. Facebook or Twitter feed). The remote user may then log into the management server and purchase goods and/or services for the local customer.

In another embodiment, a point of sale device and/or a management system receives and manages online purchases. The point of sale device and/or management system, together and/or separately, track the online and offline orders, merge the online and offline orders, and manage the orders to completion. For example, the management system may manage payment processing in some embodiments.

In another embodiment, a point of sale device and/or a management system identifies various virtual business management chains and manages those virtual business management chains. For example, the modified point of sale device and/or management system may together and/or separately manage the supply chain, track inventory, manage accounting records, etc.

In one embodiment, the mobile client device and/or the point of sale device are modified to include additional hardware and or software to facilitate the online to offline commerce. Additional modifications and features will become evident in view of the following description.

FIG. 1 depicts a block diagram of environment 100 suitable for facilitating online to offline commerce. Environment 100 includes a plurality of client devices 112A-N, a plurality of merchant point of sale (POS) devices 122A-N, a plurality of merchant web servers 130A-N, a host server 140, database repositories 141-143, payments systems 150, a plurality of advertisers 160A-N, a plurality of data miners 170A-N, a plurality of social networks 180A-N, a plurality of application developers 185A-N, and network 190.

Host server 140 is configured to communicate with client devices 112A-N, POS devices 122A-N, merchant web servers 130A-N, payments systems 150, advertisers 160A-N, data miners 170A-N, social web servers 180A-N, and application developers 185 in order to facilitate online to offline commerce as described herein. It is appreciated that the host server 140 may also be referred to as a management server.

In one embodiment, the host server 140 facilitates online to offline commerce by determining one or more user-specific advertisements to electronically deliver to the users within environment 100. In one embodiment, the one or more user-specific advertisements may be determined to reduce a merchant's perishable inventory (e.g., food products). In other embodiments, the user-specific advertisements may be designed to simply increase traffic or business.

In one embodiment, the host server 140 manages inventory, tracks accounting information, and can automatically re-order inventory items when necessary. In one example of operation, the host server 140 receives a list of inventory items, determines a promotion or advertisement designed to reduce a specific merchant's inventory items, and electronically provides the promotion to a plurality of consumers. In some embodiments, the consumers may be chosen based on, for example, likelihood of acceptance of the promotion. The host server 140 subsequently receives post-sale transaction data indicating acceptance of the promotion from one or more of the plurality of consumers, and updates the list of inventory items to reflect the received transaction data. In this manner the host server 140 can manage inventory items for a merchant. It is appreciated that the post sale transaction data may be transmitted or generated by, for example, a merchant point of sale device or a merchant web server.

In some embodiments, a user can also log into the host server 140 in order to "check-in" at an affiliate merchant via a merchant POS device. For example, a user that "checks-in" with a merchant via the host server 140 can be provided with a variety of information. For example, a user can see what they have ordered in real-time (i.e., pre-bill), can pay via a mobile device, can be provided real-time coupons, etc.

The plurality of client devices 112A-N can be any systems, devices, and/or any combination of devices/systems that are able to establish a connection with another device, server and/or other system. The client devices 112A-N typically include respective user interfaces 110A-N. The user interfaces 110A-N include one or more input devices and a display or other output functionalities to present data exchanged between the devices to a user. For example, the client devices can include, but are not limited to, a server desktop, a desktop computer, a computer cluster, a mobile computing device such as a notebook, a laptop computer, a handheld computer, a mobile phone, a smart phone, a PDA, a BlackBerry® device, a Treo™, and/or an iPhone or Droid device, etc. In one embodiment, the client devices 112A-N are coupled to network 190.

In some embodiments, mobile devices of the client devices 112A-N can be configured to allow customer's to "check-in" at a merchant location using host server 140. These mobile client devices may be configured with additional software and/or hardware. For example, a mobile client device 112 may download and run applications ("apps") that provide for the communication and functionality described herein. Location information, merchant POS device information, advertisements, analytics, etc., can be exchanged over the communication link established between the mobile client devices 112A-N and the host system 140. In some embodiments, the host server 140 propagates a "check-in" notification to one or more social web servers 180A-N (e.g., Facebook, Twitter).

Both mobile and non-mobile users (e.g., a user operating a remote PC client device) of the social web servers 180A-N may subsequently be notified by the various social web or media servers that the user of the mobile client device has "checked-in" at the merchant's location. The mobile and/or non-mobile users of the social web server may be notified via, for example, a social news feed, email, etc. It is appreciated that in some cases a user may check in at non-merchant locations. For example, a user may "check-in" at landmarks or prominent points of interest (e.g., the Grand Canyon or the Golden Gate Bridge, etc.). It is appreciated that remote users may purchase other items such as, for example, admission tickets, souvenirs, etc., at these points of interest.

In some embodiments, when users of the social web servers are notified that one or more online friends have checked-in, the users can then request to modify pre-sale transaction data associated with the one or more online friends that have checked in. For example, a first person may check-in at a coffee shop in Seattle. The host system 140 subsequently sends a check-in notification to one or more of the social web servers 180A-N indicating that the first person has checked-in. Alternatively or additionally, the host system 140 sends a request to one or more of the social web servers to check the user in. In one embodiment, the social web servers 180A-N receive the check-in notification and responsively update the first person's status (e.g., on the first person's social web feed). One or more of the first person's online friends may see the first person's updated status (i.e., that the first person checked into a coffee shop in Seattle) and subsequently purchase goods and/or services (e.g., a coffee) for the first person.

In one embodiment, the mobile client device of devices 112A-N can be configured to communicate with one or more merchant POS devices 122A-N upon "check-in" at the merchant location. Components of the merchant POS devices 122A-N are discussed in more detail with respect to FIG. 3. The plurality of merchant POS devices 122A-N can be any systems, devices, and/or any combination of devices/systems that are able to establish a connection with network 190 and/or other similar systems. The merchant POS devices 122A-N typically include respective POS user interfaces 120A-N. The POS user interfaces 120A-N include one or more input devices and a display or other output functionalities to present merchant related data. The merchant POS devices 122A-N can include, but are not limited to, a server desktop, a desktop computer, a computer cluster, a mobile computing device such as a notebook, a laptop computer, a handheld computer, a mobile phone, a smart phone, a PDA, a BlackBerry™ device, a Treo™, and/or an iPhone, etc. The POS devices can also include cash drawers, receipt printers, customer displays, barcode scanners, and/or debit/credit card readers and processing systems. In one embodiment, the POS devices are coupled to network 190.

For offline orders, merchant POS devices 122A-N typically forward transaction details (e.g., purchase information) to payment systems 150. This can be done via an SSL encrypted connection to a payment server (not shown for simplicity) hosted by the payment systems 150, for example. The payment systems 150 can be, for example, payment gateways, payment processors, banks, etc. The payment system 150 are discussed in more detail with respect to co-pending U.S. patent application Ser. No. 13/228,290 entitled "TRACKING OFFLINE COMMERCE AND ONLINE ACTIVITY", which was filed on Sep. 8, 2011, the contents of which are expressly incorporated by reference herein.

In some embodiments, one or more of the plurality of POS devices 122A-N can be affiliate (e.g., modified) POS devices. Unlike non-affiliate (e.g., un-modified or standard) POS devices, affiliate POS devices can communicate with the host server 140 allowing the merchant POS devices 122A-N to communicate off-line commerce, employee information, etc. directly to the host server 140. Likewise, an affiliate merchant POS device is configured to receive information including on-line order information and customer information from the host system 140. In some embodiments, the merchant POS device tracks and manages all forms data from the merchant's business (i.e., all virtual business chains).

The network 190, to which the client devices 112A-N and merchant POS devices 122A-N are coupled, can be a telephonic network, an open network, such as the Internet, or a private network, such as an intranet and/or the extranet. For example, the Internet can provide file transfer, remote log in, email, news, RSS, and other services through any known or convenient protocol, such as, but not limited to the TCP/IP protocol, Open System Interconnections (OSI), FTP, UPnP, iSCSI, NSF, ISDN, PDH, RS-232, SDH, SONET, etc.

The network 190 can be any collection of distinct networks operating wholly or partially in conjunction to provide connectivity to the client devices 112A-N, merchant POS devices 122A-N, merchant web servers 130A-N, payment systems 150, advertisers 160A-N, data miners 170A-N, social web servers 180A-N, and application developers 185A-N. In one embodiment, communications to and from the client devices 112A-N and to and from the merchant POS devices 122A-N can be achieved by, an open network, such as the Internet, or a private network, such as an intranet and/or the extranet.

The client devices 112A-N and merchant POS devices 122A-N can be coupled to the network (e.g., Internet) via a dial-up connection, a digital subscriber loop (DSL, ADSL), cable modem, wireless connections, and/or other types of connection. Thus, the client devices 112A-N can communicate with remote servers (e.g., merchant web servers 130A-N, host servers, mail servers, and/or instant messaging servers, etc.) that provide access to user interfaces of the World Wide Web via a web browser, for example. Likewise, the merchant POS devices 122A-N can communicate with remote servers (e.g., merchant web servers 130A-N, host servers, and/or gateways, etc.) that provide access to user interfaces of the World Wide Web via a web browser, for example.

The merchant database 141, customer database 142, and advertisements (ads) database 143 can store information such as software, descriptive data, images, system information, drivers, and/or any other data item utilized by parts of the host server 140 and/or merchant POS devices for operation. The merchant database 141, customer database 142, and ads database 143 can be managed by a database management system (DBMS) such as, but not limited to, Oracle, DB2, Microsoft Access, Microsoft SQL Server, PostgreSQL, MySQL, FileMaker, etc.

The merchant database 141, customer database 142, and advertisements (ads) database 143 can be implemented via object-oriented technology and/or via text files, and can be managed by a distributed database management system, an object-oriented database management system (OODBMS) (e.g., ConceptBase, FastDB Main Memory Database Management System, JDOinstruments, ObjectDB, etc.), an object-relational database management system (ORDBMS) (e.g., Informix, OpenLink Virtuoso, VMDS, etc.), a file system, and/or any other convenient or known database management package. As shown, merchant database 141, customer database 142, and advertisements (ads) database 143 are coupled to host server 140. It is appreciated that, in some embodiments, the merchant database 141, customer database 142, and advertisements (ads) database 143 may be alternatively or additionally directly coupled to network 190, merchant POS devices 122A-N, and/or distributed across multiple systems.

In some embodiments, a set of data or a profile related to a customer may be stored in the customer database 142. For example, a set of data related to online and offline purchase history may be stored in customer database 142. Additionally, the customer database 142 may include customer preference information, customer account information, payment information, customer social networking information, etc. The customer information can be accessed and utilized by the host server 140, for example, to identify user-specific advertisements and generate reports useful to the merchants and/or data miners.

In some embodiments, information related to the various affiliate merchants is stored in the merchant database 141. The affiliates can be merchants that provide goods and/or services to consumers, including users of client devices 112A-N. For example, affiliates can be online retailers, bricks and clicks retailers, and/or traditional brick and mortar retailers. In some embodiments, merchant database 141 can also include other affiliate specific information such as, for example, inventory data, aggregate and non-aggregate customer data, employee information, menu information, merchant website information, etc. In some embodiments, the merchant database 141 may also include real-time information related to the merchant that can be shared with a user via an internet accessible device once the user has "checked-in" using that device. For example, a user that has "checked-in" to a merchant's restaurant via a web accessible device can view, via the device, what the user has ordered in real-time, current deals (e.g., deals of the day at nearby locations), etc., and electronically pay via the mobile client device.

In some embodiments, a set of data related to advertisers can be stored in the ads database 143. Advertisers 160A-N can access host server 140 and submit advertisements that can be later be accessed and used in the construction of promotions. For example, the ads may be matched with individual users based on a customers online and/or offline activity, behavior, and/or customer preferences. In some embodiments, advertisers include lead generators such as, for example, Groupon and Yelp; although other lead generators are also possible.

In one embodiment, the plurality of data miners 170A-N communicate with the host system 140 via network 190. The data miners 170A-N include any company and/or server that is configured to gather information such as, for example, Google or Yahoo servers that gather customer data for analytics. In one embodiment, the host system provides the data miners 170A-N raw data. In some cases, the information provided to the data miners 170A-N (either through push or pull operations) can be scrubbed of identifying user information. In some cases, customers are asked to submit to certain information being shared including but not limited to identifying customer information.

In one embodiment, a customer (e.g., customer 105) patronizing a merchant and located at the merchant's facility can essentially access the merchants point of sale system 120A-N in order to modify and/or pay for goods or services via the host system 140. For example, a customer can access and view an itemized pre-sale transaction data (e.g., itemized pre-bill for goods and/or services) by logging into or otherwise accessing the host system 140 using a mobile client device 112A (e.g., a smartphone). In order to facilitate this online to offline commerce, the host system 140 is in communication with a merchant point of sale device 120A-N located at the merchant facility. The customer can then modify (e.g., buy goods and/or services) and/or pay for goods and/or services using the mobile client device 112A.

In one embodiment, a remote customer (e.g., a user not located at the merchant facility) can log into or otherwise access the host system 140 and thereby gain access to a merchant point of sale device 120A-N located at the customer facility in order to modify and/or pay for goods and/or services for social friends, family and/or acquaintances (i.e. local customers). To begin, the remote customer may be notified or otherwise identify the location of a local customer. For example, a customer may check in at a merchant's facility (e.g., bar or restaurant) via the host server 140 as described herein. The host server 140 may then distribute the check-in information to various social web servers 180A-N (i.e., Facebook, Twitter, etc.). In this example, the remote customer identifies that the local customer just checked in at the bar or restaurant by viewing his or her social information feed (e.g. Facebook or Twitter feed. The remote user may then log into the host server 140 to buy goods and/or services for the customer that checked in.

In another embodiment, a merchant point of sale device 120A-N and/or a host server 140, together and/or separately, receive and/or manage online purchases for a merchant. The point of sale device 120A-N and/or host server 140 track the online and offline orders, merge the online and offline orders, and manage the orders to completion. In addition, the host server 140 may manage payment processing in some embodiments such as crediting the merchant's account, charging the customers accounts, and/or interfacing with payment system 150.

In another embodiment, a merchant point of sale device 120A-N and/or a host server 140 systematically identifies various virtual business management chains and manages those virtual business management chains. For example, the merchant point of sale device 120A-N and/or host server 140 may together and/or separately manage the supply chain, track inventory, manage accounting records, etc.

Figure 2:
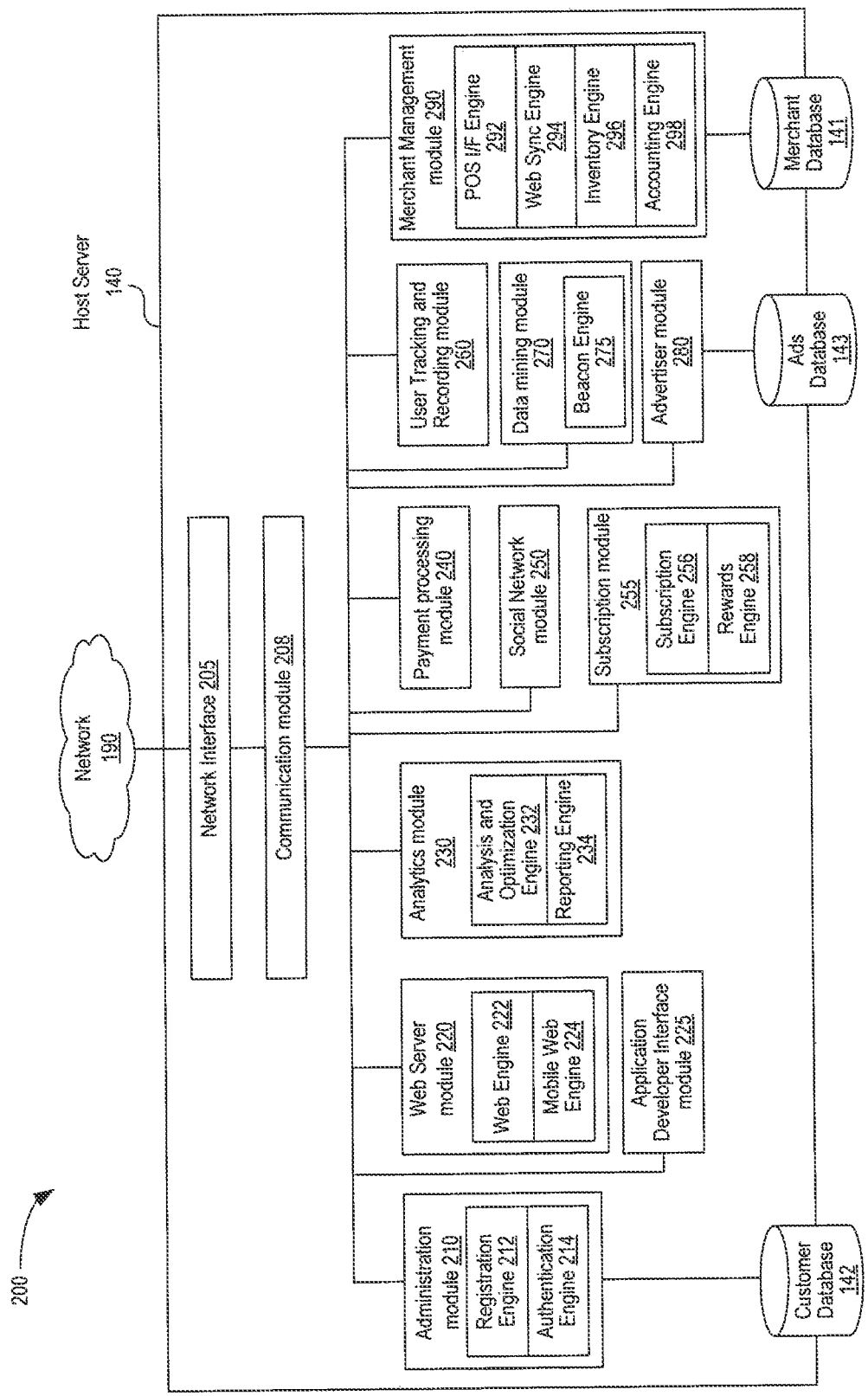
FIG. 2 depicts a block diagram illustrating the components of a host server for facilitating online to offline commerce.

FIG. 2 depicts a block diagram illustrating an example system 200 that facilitates online to offline commerce, according to one embodiment. The system 200 includes host server 140 coupled to a profile database 141, an affiliate database 142, and an ads database 143. As shown, the host server 140 is the host server of FIG. 1, although alternative configurations are possible.

The host server 140, although illustrated as comprised of distributed components (physically distributed and/or functionally distributed), could be implemented as a collective element. In some embodiments, some or all of the modules, and/or the functions represented by each of the modules can be combined in any convenient or known manner. Moreover, the functions represented by the modules can be implemented individually or in any combination thereof, partially or wholly, in hardware, software, or a combination of hardware and software. Furthermore, it is appreciated that some or all of the host server 140 modules described with respect to FIG. 2 may be included, alternatively or additionally, in whole or in part, in the merchant POS device 120 described with respect to FIG. 3.

In the example of FIG. 2, the host server 140 includes a network interface 205, a communication module 208, an administration module 210, a web server module 220, an analytics module 230, a payment processing module 240, a social network module 250, a subscription module 255, a user tracking and recording module 260, a data mining module 270, an advertiser module 280, and a merchant management module 290. Additional or fewer modules can be included.

The host server 140 can be communicatively coupled to the merchant database 141, and/or the customer database 142, and/or the ads database 143, as illustrated in FIG. 2. In some embodiments, the merchant database 141, the customer database 142, and the ads database 143 are partially or wholly internal to the host server 140. In other embodiments, the merchant database 141, and/or the customer database 142, and/or the ads database 143 are coupled to the host server 140 over network 190. In one or more embodiments, the merchant database 141, and/or the customer database 142, and/or the ads database 143 are distributed across and/or replicated to both the merchant POS devices and the host server 140.

In the example of FIG. 2, the network interface 205 can be one or more networking devices that enable the host server 140 to mediate data in a network with an entity that is external to the server, through any known and/or convenient communications protocol supported by the host and the external entity. The network interface 205 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

In the example of FIG. 2, the host server 140 includes the communications module 208 communicatively coupled to the network interface 205 to manage a communication session over a plurality of communications protocols. In one embodiment, the communications module 208 receives data (e.g., audio data, textual data, audio files, etc.), information, commands, requests (e.g., text and/or audio-based), and/or text-based messages over a network. Since the communications module 208 is typically compatible with receiving and/or interpreting data originating from various communication protocols, the communications module 208 is able to establish parallel and/or serial communication sessions with users of remote client devices, merchant POS devices, payment systems, advertisers, web servers, and data miners.

One embodiment of the host server 140 includes an administration module 210. The administration module 210 can be any combination of software agents and/or hardware components able to manage and register users of host server 140. The administration module 210 includes a registration engine 212 and an authentication engine 214.

In one embodiment, the registration engine 212 is configured to register new users, affiliate POS devices, advertisers, and/or application developers with the system and/or create new accounts with the host server 140. During registration the user can provide login credential for the various social networking sites that they would like to log-in to or from, and to which the user would like to provide status updates from the host server 140. The authentication engine 214 is configured to authenticate the host users as they access the host server 140 from a variety of devices. In some embodiments, authentication occurs by associating a user's username and password with an existing user account and/or associating an affiliate POS device with an existing affiliate account and/or associating an advertiser's username and password with an existing advertiser account. Unauthorized users, affiliate or merchant POS devices, and/or advertisers can be directed to register with the system. In some embodiments, unauthorized advertisers can be permitted to submit advertisements without registering. However, advertisements for these unregistered advertisers may be given less priority.

In some embodiments, advertisers can register for an account so that the advertisers can provide ads that will be evaluated by host server 140 in order to provide the users with the one or more user-specific advertisements. In some embodiments, the advertisers are merchants (i.e., either affiliate or non-affiliate merchants). The host server 140 can provide user-specific advertisements to the customers, and thus small and medium sized businesses or merchants can direct advertisements to the customers that are most likely to patronize their establishment (off-line and/or online).

One embodiment of the host server 140 includes a web server module 220. The web server module 220 can be any combination of software agents and/or hardware components able to interact with users that have logged in or otherwise access or interact with the host server 140. In one embodiment, the web server module 220 provides access to customers, merchants, advertisers, and/or data miners via a web interface.

In one embodiment, the web server module 220 includes a web engine 222 and a mobile web engine 224. As discussed, in some embodiments a user can access the host server 140 from a mobile client device. The mobile web engine 224 provides the mobile client device an interface similar to the interface provided by web engine 222; however, the mobile interface is optimized for mobile devices. In some embodiments, the mobile web engine 224 interacts with one or more applications ("apps") installed on the mobile client device.

In some embodiments, the web server module 220 presents one or more user-specific promotions to a customer through a web portal. The mobile web portal also allows interaction with a merchant POS device. In other embodiments, the web server 220 presents one or more merchant-specific promotion designs or concepts to a merchant via the web portal. The merchant can view and select appropriate promotions for delivery to potential customers. Promotions may be presented to a user via a printed receipt from the merchant POS device, electronically via the mobile client device, and/or electronically via other methods such as, for example, email.

One embodiment of the host server 140 includes an application developer interface module 225. The application developer interface module 225 can be any combination of software agents and/or hardware components able to interface with application developers. For example, application developers can interact with the host server 140 to post/publish applications on an application exchange system. The application developer interface module 225 provides and manages the licensing terms available to the application developers, certifies applications uploaded to the host system 140, and makes the applications available for download to merchants and/or consumers.

One embodiment of the host server 140 includes an analytics module 230. The analytics module 230 can be any combination of software agents and/or hardware components able to analyze merchant and/or customer information, determine promotions and various other reports to optimize merchant business chains, employee efficiency, etc., and report the analytics to the merchant POS and/or data miners. The analytics module 230 includes an analysis and optimization engine 232 and a reporting engine 234.

In one embodiment, the analysis and optimization engine 232 processes information received from each merchant on an individual basis to provide the merchants with business performance statistics and optimization suggestions. However, in some instances, the analysis and optimization engine 232 may alternatively or additionally process information received from a plurality of merchants, aggregate this information, and provide the aggregate information to data miners such as, for example, Google or Yahoo. The analysis and optimization engine can determine one or more user-specific advertisements based on online and offline transaction commerce data.

In one embodiment, the reporting engine 234 stores merchant preferences regarding the particular types of analytics to be performed including the types of business chains on which to perform analytics and how the analytics should be displayed. For example, a merchant may choose to have analytics presented related to: sales information, inventory information, customer information, forecast information, employee information, and promotional information. The analytics may be displayed to the merchants in any number of ways. For example, the analytics may be displayed via a plurality of panes. An example of the various panes that can be used is illustrated and discussed in more detail with respect to FIG. 14.

One embodiment of the host server 140 includes a payment module 240. The payment module 240 can be any combination of software agents and/or hardware components able to facilitate payment between customers and payment system 150. The payment module 240 can facilitate payment by and between customers, merchants, payment systems, advertisers, data miners, and application developers. The payment module 240 can also manage and track accounts for customers, merchants, advertisers, data miners, and application developers. For example, the payment module 240 can receive payment from a remote customer for a friend of the customer's that is checked-in at a merchant location, pay the merchant for the purchase, and debit the remote customer's account. Debiting the remote customer's account may include facilitating payment via payment systems 150.

One embodiment of the host server 140 includes a social network module 250. The social network module 250 can be any combination of software agents and/or hardware components able to manage customer social network information and status updates/changes. For example, the social network module 250 may process customer status changes (e.g., "check-in" and/or "check-out" indications or requests) and location information received from mobile device customers, identify one or more of the customer's social networks, and notify the customer's social networks of the status changes and/or location information updates.

In one embodiment, the social network module 250 allows customers that are logged in to the host server to "check-in" with one or more social networking sites such as, for example, Facebook, FourSquare, and/or Twitter. In some cases, a user can directly log-in or "check-in" to more than one social networking sites via the host server 140. For example, a user may "check-in" to a location using the host server and the host server can then automatically manage the "check-in" status (e.g., "check-in" and "check-out") at the various social networking websites. Thus, among other features, host server 140 provides a central location for providing status and location information to social networking websites for broadcast to friends via various channels or feeds.

One embodiment of the host server 140 includes a subscription module 255. The subscription module 255 can be any combination of software agents and/or hardware components able to manage subscriptions and rewards. The subscription module 255 includes a subscription engine 256 and a rewards engine 258.

In one embodiment, the subscription engine 256 manages customer subscriptions. Customers may sign up with the host server 140 for a subscription that entitles the customers to one or more specific benefits. For example, a customer may pay for a weekly subscription to services offered via the host server 140 which entitles the customer to a number of VIP meals a week at participating restaurants.

In one embodiment, the loyalty or rewards engine 258 tracks user purchases at participating or affiliated merchant locations and provides the users rewards that can be used to purchase goods and/or services at the participating or affiliated merchant locations. For example, a customer may frequent an affiliated merchant location and receive reward points on each visit or based on the number and/or quantity of items purchased. The customer may be able to use the reward points to purchase meals and/or services at affiliate merchants or other merchant locations when the reward points meet or exceed a threshold. In some embodiment, the rewards may be redeemable remotely (e.g., to purchase goods and/or services for an online friend).

When a customer logs into or otherwise accesses the host server 140, the host server 140 can provide the user with various account and reward information. For example, users may register for an account with the host server 140 so that the user can log-in or "check-in" to the host server and be provided with information such as, for example, electronic receipts from various affiliate merchants and other benefits including, but not limited to, reward points, promotions, etc.

One embodiment of the host server 140 includes a user tracking and recording module 260. The user tracking and recording module 260 can be any combination of software agents and/or hardware components able to monitor or track and store offline and online activity (e.g., transactions) of a customer. The user activity that can be tracked can include, but is not limited to, online researching of a product or a merchant and/or items purchased. In some embodiments, the user activity is analyzed by analytics module to generate user-specific advertisement and/or to determine the likelihood that a consumer would like to receive information about a specific promotion.

In some embodiments, a new user can be asked to consent to the tracking and recording of his user behavior. The user is informed that maintaining the user's tracking information serves to enhance the quality and relevance of the advertisements.

One embodiment of the host server 140 includes a data mining module 270. The data mining module 270 can be any combination of software agents and/or hardware components able to track and examine data processed by the host server 140.

In one embodiment, the data mining module 270 includes a beacon engine 265. The beacon engine 265 is configured to interact with requests from data miners for specific data. For example, in response to a request for data, the beacon engine 265 may beacon the requested data for tracking purposes, process the data into one or more reports, and deliver the reports to the data miners. The reports may be delivered by pushing the report to the data miner through an application program interface (API) or allowing the data miner to pull the report through the API.

One embodiment of the host server 140 includes an advertiser interface module 280. The advertiser interface module 280 can be any combination of software agents and/or hardware components able to interface with merchant POS devices and advertisers. In some embodiments, the advertiser interface module 280 provides an interface to advertisers or lead generators such as, for example, Groupon and Yelp, that allows the advertisers to store, add, modify, and remove advertisements to and from the ads database 143. The advertiser interface module 280 can also provide an interface to merchants via a merchant POS device and/or other web-accessible client devices for uploading and/or downloading advertisements from the database.

One embodiment of the host server 140 includes a merchant management module 290. The merchant management module 290 can be any combination of software agents and/or hardware components able to interface with merchants. The merchant management module 290 includes a POS Interface (IIF) engine 492, a web sync engine 494, an inventory engine 296, and an accounting engine 298.

In one embodiment, the POS IIF engine 292 is configured to send and/or receive merchant information over a communication link established between a merchant POS device and the host server 140. In some cases, the merchant management module 290 interfaces with merchant POS devices such that all merchant information is replicated in real-time (or close to real-time). In some cases, the merchant POS devices act as client devices pushing and pulling information from the host server 140 using the merchant management module.

In one embodiment, the web sync engine 294 is configured to interface with merchant's web servers including synchronizing stored merchant information with the merchant's website. For example, a merchant manager may modify a menu item via a POS device. In some cases, the POS device includes one or more storage containers that locally store the menu information; however, the menu information is also replicated to the host server 140 for storage in the merchant database 142. Thus, when a change is made to the menu at the POS device, the menu is automatically saved to the merchant database 142 and the merchant web site is dynamically updated.

In one embodiment, the inventory engine 296 is configured to monitor and manage a merchant's inventory. For example, the host server may receive online and/or offline itemized transaction data and automatically update the merchant's inventory based on these orders. Further, inventory updates (e.g., shipments) can be entered into the merchant POS device for replication and tracking purposes in the merchant database 142. In some embodiments, the merchant POS device may include an RFID tag reader capable of reading inventory data. A more detailed description of an example of the inventory management process in discussed with respect to FIG. 9.

In one embodiment, the accounting engine 298 is configured to track accounting information, perform accounting analysis, and format the accounting information for export to various accounting software tools.

Figure 3:
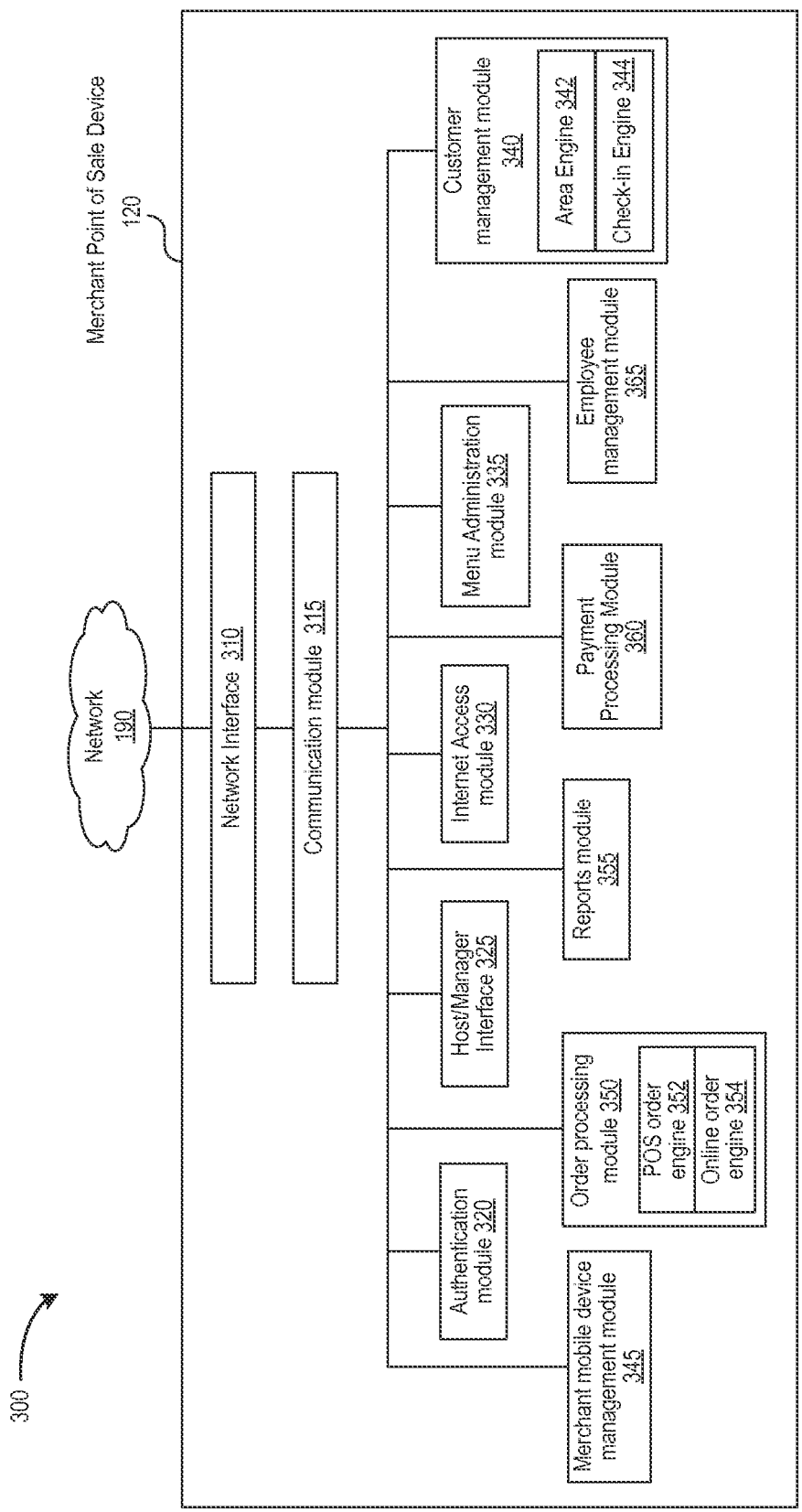
FIG. 3 depicts a block diagram illustrating the components of a point of sale device for facilitating online to offline commerce.

FIG. 3 depicts a block diagram illustrating an example system 300 that facilitates online to offline commerce, according to one embodiment. The system 300 includes a network interface 310, a communications interface 315, a merchant POS device 120 coupled to a reports database 144 and a customer database 142. As shown the merchant POS 120 is the merchant POS device of FIG. 1; although alternative configurations are possible. It is appreciated that the network interface 310 and the communication interface 315 may be similar to the network interface and communication interface described with respect to FIG. 2.

The merchant POS device 120, although illustrated as comprised of distributed components (physically distributed and/or functionally distributed), could be implemented as a collective element. In some embodiments, some or all of the modules, and/or the functions represented by each of the modules can be combined in any convenient or known manner. Moreover, the functions represented by the modules can be implemented individually or in any combination thereof, partially or wholly, in hardware, software, or a combination of hardware and software. Furthermore, it is appreciated that some or all of the merchant POS device 120 modules described with respect to FIG. 3 may be included, alternatively or additionally, in whole or in part, within the host server 140 described with respect to FIG. 2.

One embodiment of the merchant POS device 120 includes an authentication module 320. The authentication module 320 can be any combination of software agents and/or hardware components able to authenticate users of the merchant POS device 120. In some embodiments, specific information such as, for example, employee information may have restricted access to merchant managers. Accordingly, accessing the employee information may require an employee ID or password.

One embodiment of the host server 140 includes a host/manager interface module 325. The host/manager interface module 325 can be any combination of software agents and/or hardware components able to electronically display merchant information to a user of the merchant POS device and receive input from the user.

One embodiment of the host server 140 includes an internet access module 330. The internet access module 330 can be any combination of software agents and/or hardware components able to access the Internet and, in particular, access merchant support information and the host server 140 website.

One embodiment of the host server 140 includes a menu administration module 335. The menu administration module 335 can be any combination of software agents and/or hardware components able to display, modify, and make menu recommendations to a user of the merchant POS device.

One embodiment of the host server 140 includes a customer management module 340. The customer management module 340 can be any combination of software agents and/or hardware components able to manage online and offline customer account information and, in some cases, interact with the host server to store this information. The customer management module includes an area engine 342 and a check-in engine 344.

In one embodiment, the area engine 342 manages the location or real-time seating arrangements of customers within the merchant facility and provides a graphical layout for display to a user of the merchant POS device 120. In some cases, the locations of the customers may be broken down by room (e.g., main dining room, bar, private rooms, etc.). The area engine 342 provides for graphical display of the tables and the customers at those tables. An example screenshot illustrating an area layout and display is shown in FIG. 10B.

One embodiment of the host server 140 includes a merchant mobile device management module 345. The merchant mobile device management module 345 can be any combination of software agents and/or hardware components able to communicate with and manage various merchant mobile devices (i.e., tablet handheld computers used by the wait staff and/or various computers located in the merchant kitchen, bar, etc.).

One embodiment of the host server 140 includes an order processing module 350. The order processing module 350 can be any combination of software agents and/or hardware components able to receive, process, and manage online and offline orders. The order processing module 350 includes a POS order engine 353 and an online order engine 354.

One embodiment of the host server 140 includes a reports module 355. The reports module 355 can be any combination of software agents and/or hardware components able to together with the host server 140 or separately process merchant and customer data and provide various reports to a user of the merchant POS device. In some embodiments, the reports include various analytics that may be displayed to the merchants in any number of ways. For example, the analytics may be displayed via a plurality of panes. An example of the various panes that can be used is illustrated and discussed in more detail with respect to FIG. 14.

One embodiment of the host server 140 includes a payment processing module 360. The payment processing module 360 can be any combination of software agents and/or hardware components able to process payment for online and offline orders, supplier payments, etc.

One embodiment of the host server 140 includes an employee management module 365. The employee management module 365 can be any combination of software agents and/or hardware components able to manage the merchant employee information. The merchant employee information can include, but is not limited to, schedule information, payment information, performance reports, etc.

Figure 4A:
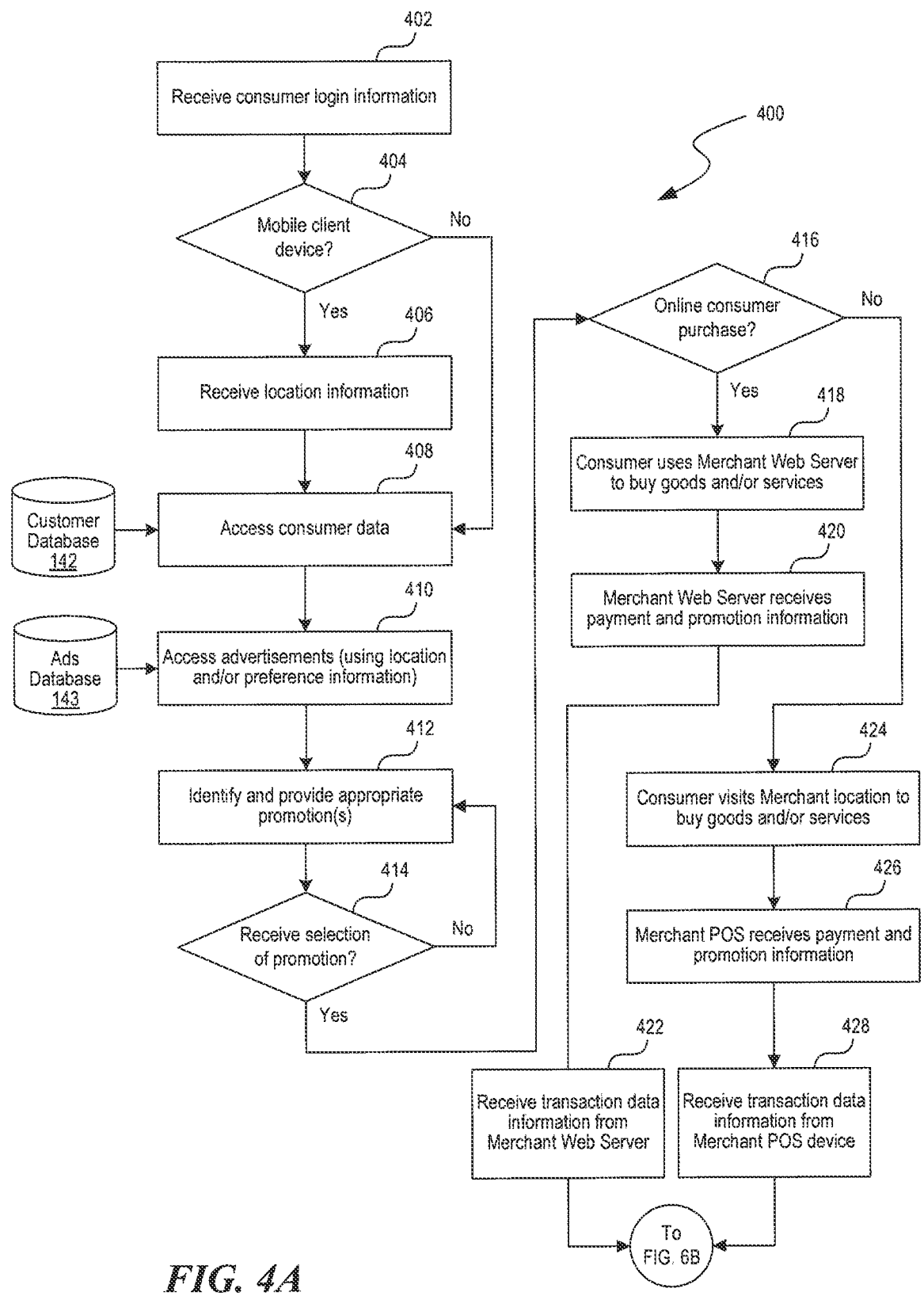
FIGS. 4A-4C depict a flow diagram illustrating an example process for providing advertising recommendations to affiliated consumers and merchants.
Figure 4B:
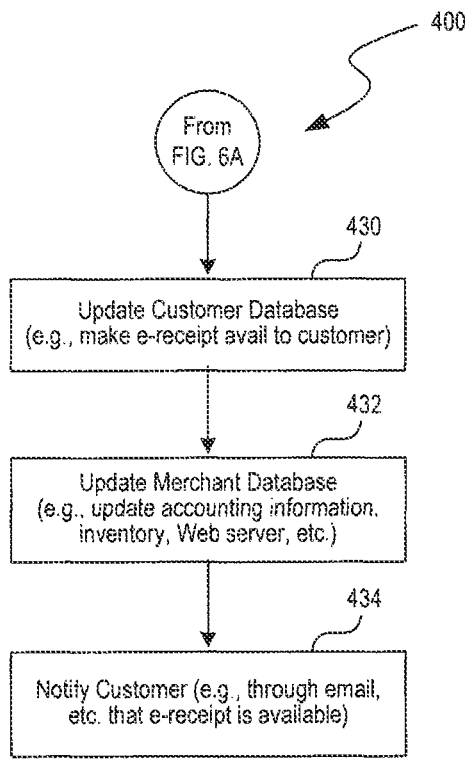

FIGS. 4A-4B depict a flow diagram illustrating an example process 400 for providing advertising recommendations to affiliated consumers and merchants. Referring first to FIG. 4A, in process 402, the host server receives consumer login information. In some embodiments, the login information can include a customer identification (ID)/password combination. In some cases, a customer can configure the mobile client device to save the customer ID/password information so that the customer does not have to enter it each time that he/she accesses the host server.

In process 404, the host server determines whether the customer has logged in via a mobile client device. If so, in process 406, location information is requested and/or otherwise received from the mobile client device. Otherwise, the host server proceeds to process 408. In process 408, the host server accesses consumer data or information from the customer database 142. For example, the host server may access a history of transaction data for the consumer and/or a variety of preference or profile information previously determined or entered by the customer. In process, 410, the host server accesses advertisements using the location and/or preference and profile information. In one embodiment, one or more of the advertisements comprise advertisements generated or suggested by the host system to reduce inventory for the merchant, increase merchant profitability, and/or drive traffic to the merchant's facility.

In process 412, one or more appropriate advertisements or promotions are identified and electronically provided to the user. In process 414, the host server waits for a selection of one or more of the selected promotions. In some cases, no promotions are selected, and the host server attempts to identify and provide additional promotions.

Otherwise, if a promotion is selected by a user, then in process 416, the host server determines whether the customer intends to purchase or use the promotion online or offline. If the customer intends to use the promotion online, then in process 418 the consumer uses the merchant web server to buy the goods and/or services associated with promotion. In process 422, the host server receives the transaction data information from the merchant web server. If the customer intends to use the promotion offline, then in process 424 the consumer visits the merchant location to buy the goods and/or services. In this case, the customer can show the merchant the promotion which can be scanned or tracked via a promotional number. In process 426 the merchant POS receives payment and information identifying the promotion (e.g., a unique promotion number). In process 428, the host server receives the transaction data information from the merchant POS device.

Example process 400 continues in FIG. 4B. Specifically, in process 430, the host server updates the customer database to reflect the received transaction data information. As previously discussed, the customer data in the customer database is used for a variety of purposes. The host server may also store and make available an electronic receipt for the transaction. In process 432, the host server updates the merchant database. The update to the merchant database may include a variety of items including merchant accounting records, inventory records, and/or update synchronizations to the web server. Lastly, at process 434, the host server optionally notifies the customer that a transaction occurred. The optional notification can transmitted to the customer via electronic mail, text message, voice message, etc.

Figure 4C:
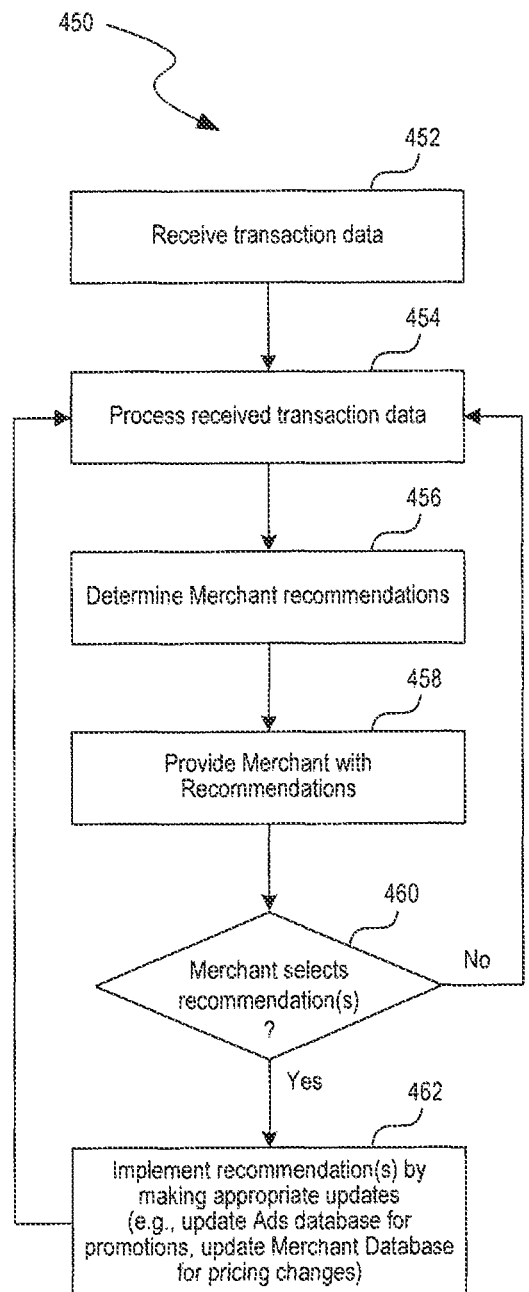

FIG. 4C depicts a flow diagram illustrating an example process 450 for providing advertising recommendations to affiliated merchants. In one embodiment process 450 commences each time that the host server receives online and/or offline transaction data. However, it is appreciated that the example process 450 may commence or be triggered based on other events, periodically, etc.

In process 452, the host server receives online and/or offline transaction data. As previously discussed with respect to FIG. 4A, the online and/or offline transaction data may be received from a merchant POS device and/or a merchant web server. Other sources are also possible, including directly from the host server. The transaction data can represent various information about a purchase of goods and/or services including, in some cases, itemized lists of products purchased, prices, dates and times, locations, etc.

In process 454, the host server determines one or more merchant recommendations. For example, in one embodiment the host server processes the received transaction data to identify one or more suggested promotions based on current inventory. As previously discussed, the promotions may be later distributed to individual customers based on likelihood of acceptance of the promotion. In one embodiment, the recommendations can comprise non-promotional suggestions such as reminders or requests, for example, to order additional inventory, or a suggestion to price a particular menu item at recommended value (e.g., demand-based pricing).

In process 456, the host server provides the merchant with the determined recommendations. In one embodiment, the recommendations are provided via the merchant POS device. However, it is appreciated that the recommendations can be provided to and/or accessed by a merchant from any web accessible device. In process 458, the host server provides the merchant with the recommendations. In process 460, the host server determines whether one or more of the selections is selected. Lastly, if one or more selection is made, in process 462, the host server implements the recommendations by making appropriate the updates. For example, the host server may update the Ads database for promotions and/or update the merchant database for pricing changes.

Figure 5:
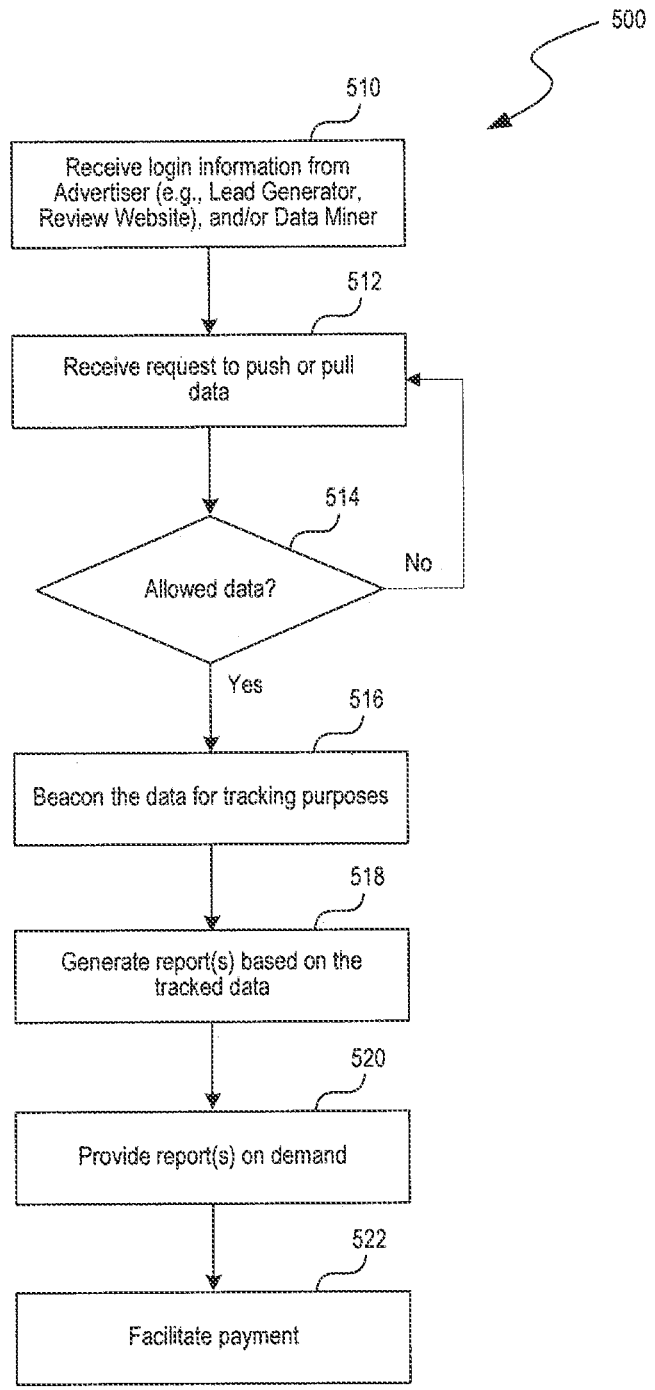
FIG. 5 depicts a flow diagram illustrating an example process for providing host server data access to affiliated advertising and/or data mining companies.

FIG. 5 depicts a flow diagram illustrating an example process 500 for providing host server data to affiliated advertising and/or data mining companies, according to an embodiment. In one embodiment, affiliate advertisers and/or affiliate data mining companies have access to a multitude of host server data including, but not limited to, customer data, merchant data, and advertisement data. The data can be accessed from the host server by the affiliate advertisers and/or the affiliate data mining companies via one or more specific APIs.

In process 510, the host server receives login information from an affiliated advertiser or data miner. In process 512, the host server subsequently receives a request to push or pull data from the host system. In process 514, the host server determines whether the requested data is allowed for that particular advertiser and/or data miner. In some embodiments, levels of access can be tiered based on an agreement. However, some identifying data may never be accessible to the advertisers and/or data miners. Further, in some cases, data is pushed or pulled in the form of a report.

In process 516, the host server beacons the data for tracking purposes. For example, data may be tracked for specific events. In process 518, the host server generates one or more data reports, and in process 520, provides the reports to the advertiser and/or data miner. Lastly, in process 522, the host server facilitates payment or credit, if necessary. For example, depending on the agreement, advertisers and/or data miners may be charged or credited for pushing or pulling data from the host server.

Figure 6:
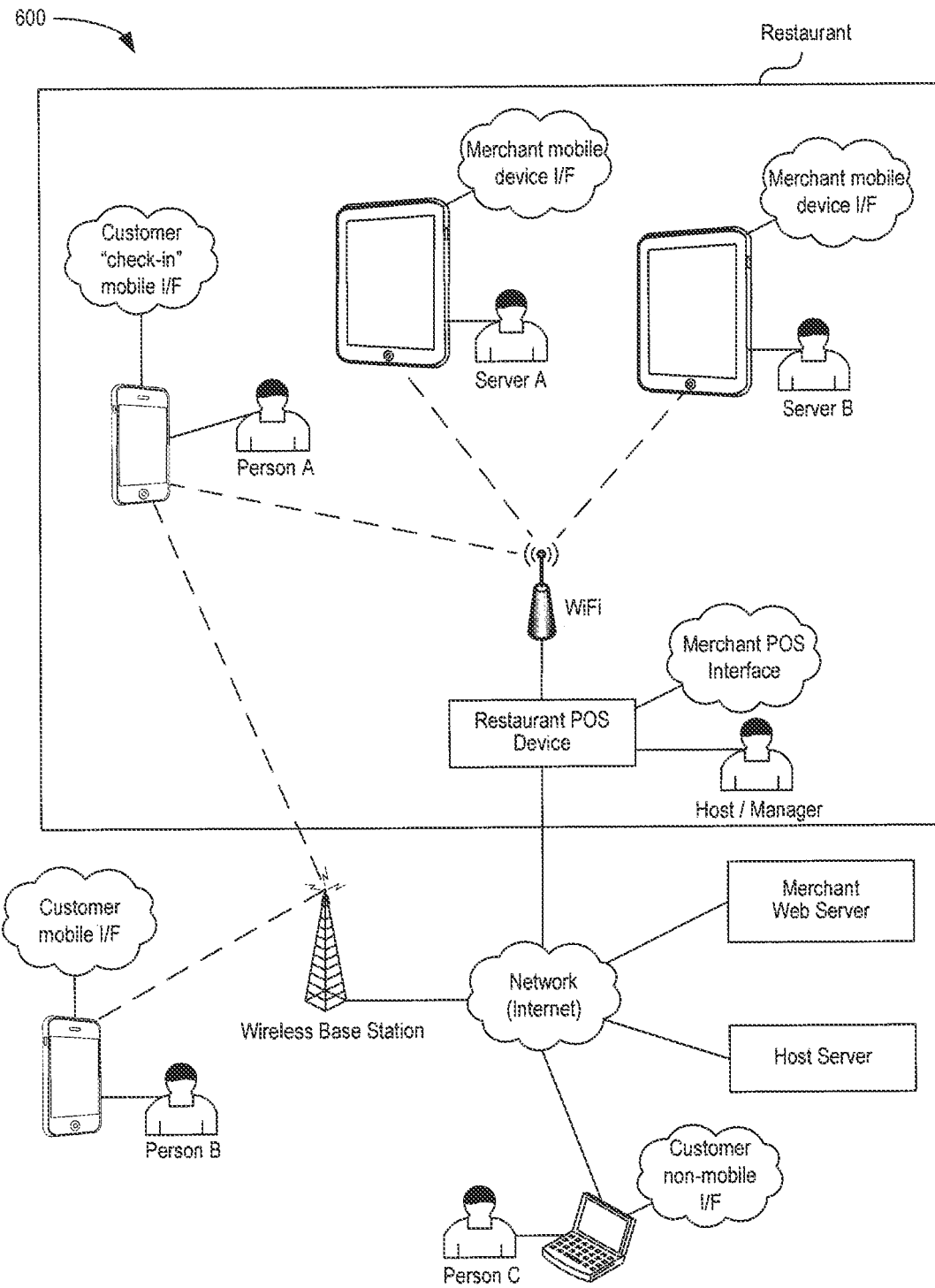
FIG. 6 depicts a block diagram of an online environment suitable for facilitating online to offline commerce.

FIG. 6 depicts a block diagram of an online environment 600 suitable for facilitating online to offline commerce, according to an embodiment. FIG. 6 provides a more detailed example of environment 100. Specifically, in FIG. 6, the merchant comprises a bar or restaurant; however, alternate configurations are possible.

Environment 600 includes an affiliate restaurant, an affiliate merchant web server, a host server, and a wireless base station all connected via a network. The host server may be host server 140 of FIG. 1; although alternative configurations are possible. The affiliate restaurant includes a restaurant POS device operated by a restaurant host and/or manager, a first food server A operating a first mobile merchant device (e.g., a tablet computer), a second food server B operating a second mobile merchant device (e.g., a tablet computer), and a first person A operating a mobile client device (e.g., smart phone device). In addition, environment 600 includes a second person B operating a mobile client device (e.g., smart phone device) in communication with the wireless base station and a third person C operating a non-mobile client device via Cable or DSL or other known connectivity schemes.

In one embodiment, person A can check-in to the affiliate restaurant via the wireless base station or the local WiFi hotspot at the restaurant. Once checked in, person A can access, view, and pay for his or her bill using the mobile client device. The host server facilitates this communication and in one or more embodiments all data requests and responses that traverse the system travel though the host server. In other embodiments, the host system facilitates a direct communication between person A's mobile client device and the restaurant POS device. The direct communication may traverse the network, but does not have to. An example of the check-in process is discussed in more detail with respect to FIG. 7.

In one embodiment, either person B or person C can remotely purchase goods and/or services for person A when person A checks-in at the restaurant. In some embodiments, person B and/or person C are notified that person A checked-in at the restaurant via a shared social network. An example of social online buying is discussed in more detail with respect to FIGS. 8A-8B.

Figure 7:
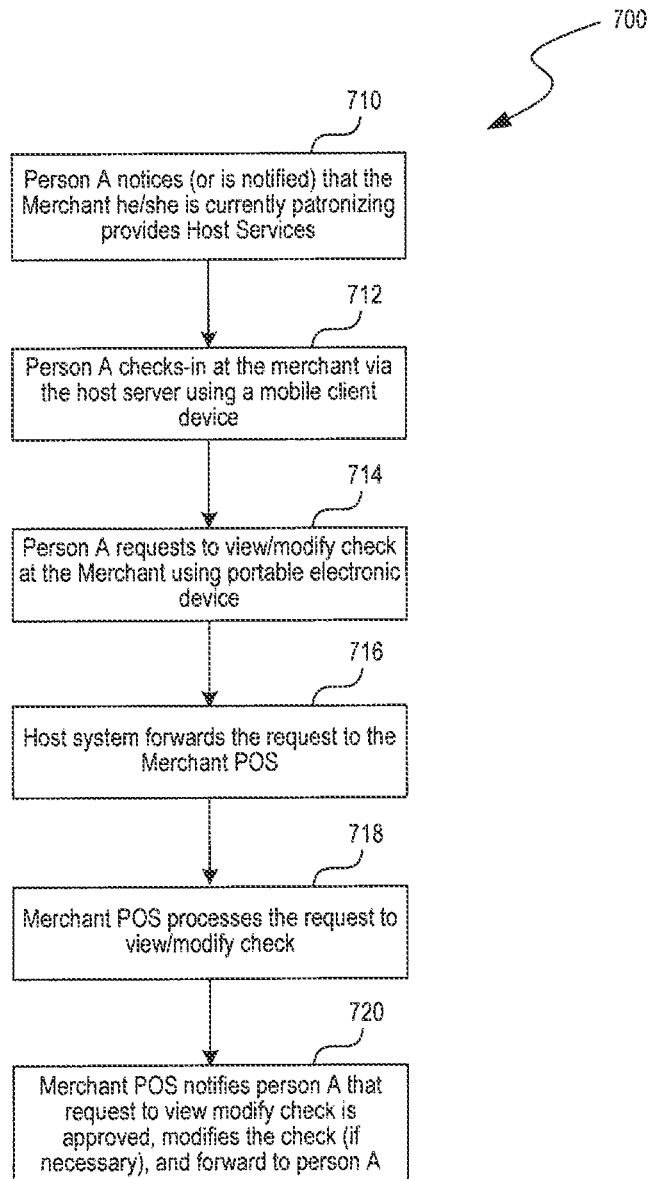
FIG. 7 depicts a flow diagram illustrating an example process for requesting real-time pre-sale transaction data via a mobile client device in an online environment suitable for facilitating online to offline commerce.

FIG. 7 depicts a flow diagram illustrating example process 700 for requesting real-time pre-sale transaction data (e.g., pre-bill) using a mobile client device in an online environment suitable for facilitating online to offline commerce, according to an embodiment. The example process 700 is described with reference to environment 600 of FIG. 6, although other configurations are possible.

In process 710, customer A notices or is notified that the merchant he/she is patronizing provides host services. For example, in one embodiment, customer A may log into the host server and search for the merchant by name. Alternatively or additionally, the mobile client device operated by customer A may provide location information to the host server allowing the host server to notify the user about the ability to "check-in" at the merchant location. In one embodiment, customer A "checks-in" at the merchant location and subsequently notices or is notified about the services that the merchant supports (e.g., "check-in," "mobile-view and pay," and/or "mobile order, view, and pay").

In process 712, customer A "checks-in" at the merchant location via the host server using a mobile client device. As previously discussed, the mobile client devices may be modified to include additional hardware and/or software to facilitate the online to offline commerce. In one embodiment, customer A "checks-in" at the merchant location via a mobile data network. In this case, all data transferred between the merchant POS device and customer A traverses the wireless base station shown in FIG. 6. In one embodiment, customer A accesses the internet via an open WiFi network at the merchant facility.

Once checked-in at the merchant location, the host server may provide customer A with the mobile capabilities of the merchant. For example, the merchant may allow a customer to "check-in and view their bill," "check-in, view, and pay" for their bill, or "check-in view, modify, and pay for their bill." The capabilities may be displayed to the user on the mobile client device. In this example, the merchant provides for view/modify capabilities, and thus, in process 714, customer A requests to view/modify the check or bill at the merchant using portable electronic device.

In process 716, the host system forwards the request to the merchant POS device. In process 718, the merchant POS processes the request to view/modify the check and associates the request with a customer. In one embodiment, associating the request with the customer further comprises confirming that the customer requested to view/modify the check. Once the request is processed, in process 712, the merchant POS device notifies customer A that the request to view/modify has been accepted, modifies the check to reflect an order (if necessary), and forwards the check (pre-bill) to customer A.

It is appreciated that customer A can then modify the check (pre-bill transaction data) any number of times before ultimately paying via the mobile client device. As previously discussed, the host server facilitates payment. In one embodiment, the host server provides fund to the merchant and debits customer A's account. In another embodiment, the host server transfers payment instructions (e.g., credit card, etc.) to the merchant POS device for payment.

Figure 8A:
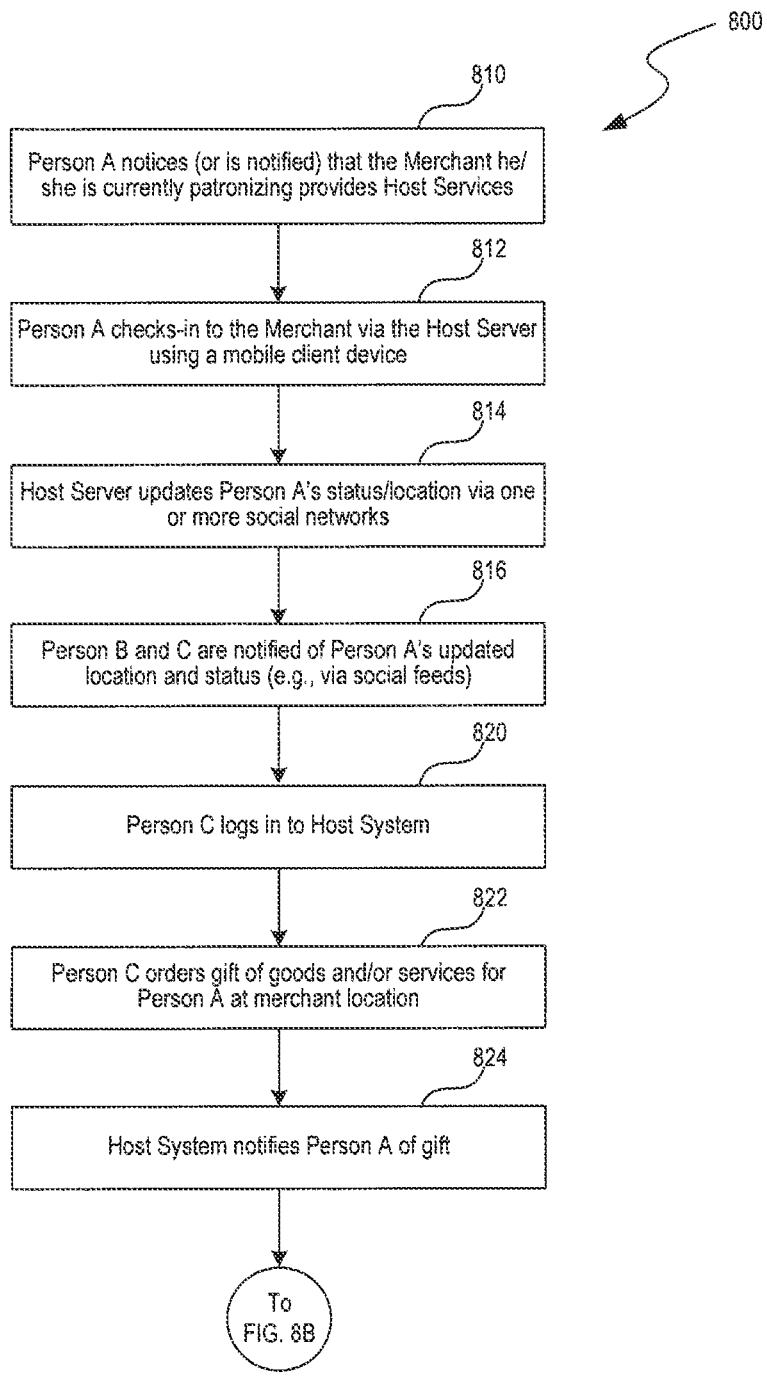
FIGS. 8A and 8B depict a flow diagram illustrating example process of social online ordering in an online environment suitable for facilitating online to offline commerce.
Figure 8B:
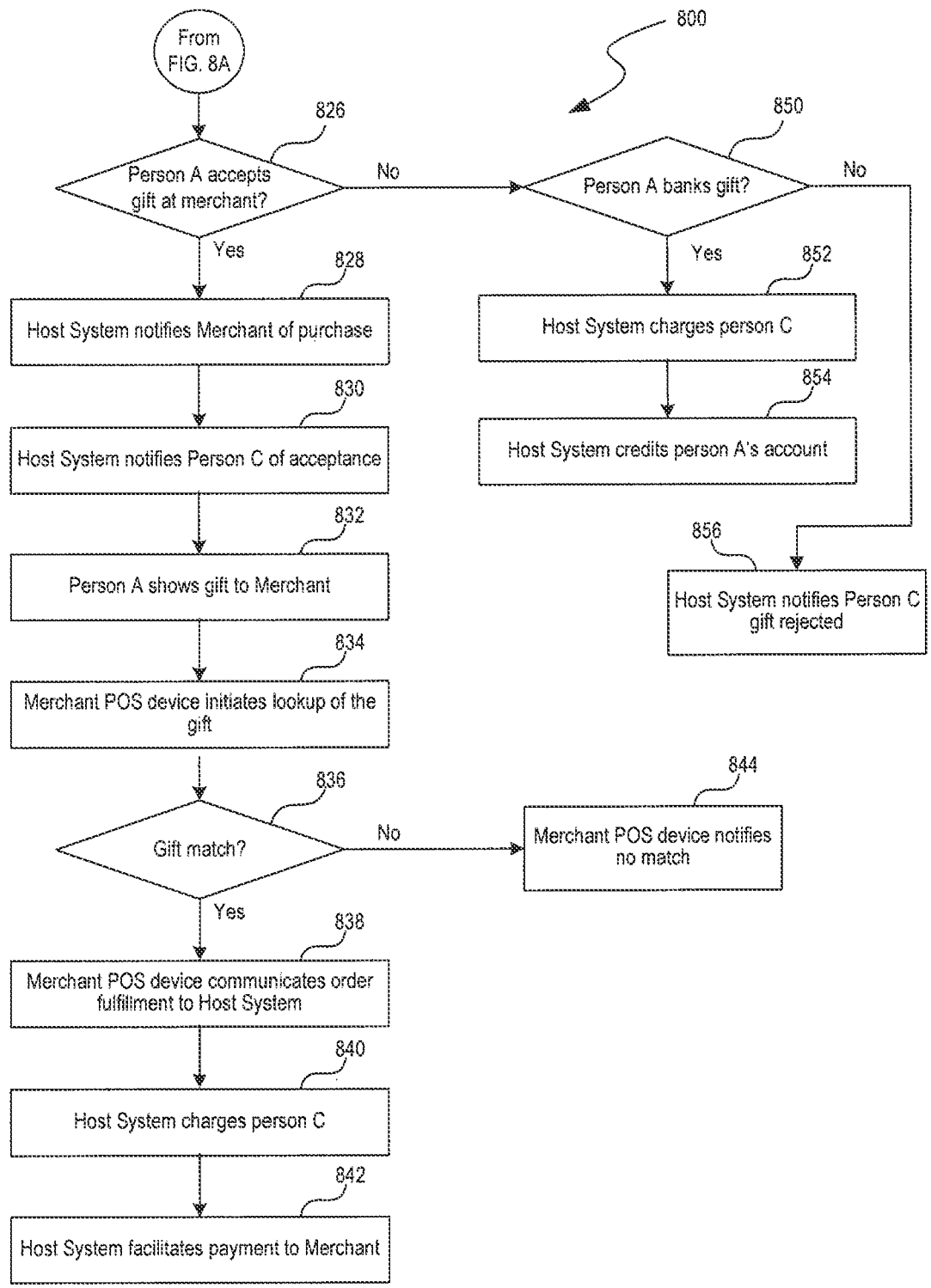

FIGS. 8A and 8B depict a flow diagram illustrating example process 800 of social online ordering in an online environment suitable for facilitating online to offline commerce, according to an embodiment. As discussed herein, the process of social online ordering allows online friends of a customer that has checked-in to a merchant location to remotely purchase goods and/or services for that checked-in customer.

In process 810, person A notices or is notified that the merchant he/she is patronizing provides host services. For example, in one embodiment, person A may log into the host server and search for the merchant by name. Alternatively or additionally, the mobile client device operated by person A may provide location information to the host server allowing the host server to notify the user about the ability to "check-in" at the merchant location.

In process 812, person A "checks-in" at the merchant location via the host server using a mobile client device. As part of the check-in process, the mobile client device may provide location information to verify location and establish which of the merchant's locations person A is checking in to in the event that the merchant has more than one location. In process 814, the host sever updates person A's status/location via one or more social networks. As previously discussed, a user can specify one or more social web server to check-in to during the check-in process. Alternatively or additionally, person A may provide the check-in information (including which social servers to check-in to and login credentials) in a user profile. Upon receiving the updates, the social web servers post person A's updates to, for example, one or more social feeds.

In process 816, person B and person C are notified of person A's updated location and status via, for example social feeds provided by the social web server. In response to receiving this notification or otherwise identifying person A's updated status, in process 820, person C logs in to the host server by providing the host server with login credentials. In process 822, person C orders a gift of goods and/or services for Person A at the merchant location. In process 824, the host system notifies person A of the gift.

Continuing the example process 800 to FIG. 8B, in process 826, the host server identifies whether or not person A accepts the gift at the merchant location. If so, in process 828, the host system notifies the merchant of the purchase. For example, the host system may send unique gift identification information to the merchant POS device. In process 830, the host system notifies person C of acceptance of the gift. In one embodiment, when person A accepts the gift, person A can enter a personal thank you message (e.g., voice or text based), which is sent to person C with the notification.

In process 832, to redeem the gift, person A shows a coupon or code to the merchant. In one embodiment, the merchant POS device or a merchant mobile device in communication with the merchant POS device can receive the coupon via Bluetooth, and/or can scan the coupon via a bar code scanner. In process 834, the merchant POS device identifies the validity of the coupon or code by looking up it up in the system. In process 836, the merchant POS device determines if there is a match. If so, then in process 838, the merchant POS communicates order fulfillment to the host system. In process 840, the host system charges person C. In process 842, the host server facilitates payment to the merchant.

If person A does not accept the gift at the merchant location, then in process 850, the host system determines whether person A wants to bank the gift. For example, person A may not want the beer that person C bought for them right now or may already have a beer that person C bought via a remote mobile device. Accordingly, if person A wants to bank the gift (i.e., add money to an account on the host server), then in process 852, the host system charges person C, and in process 854, credits person A's account which can be applied to meals at the current merchant's location and/or any other affiliate merchant's location. However, if person A does not want to accept the gift and does not want to bank the gift, then in process 856 notifies person C of the rejection.

Figure 9:
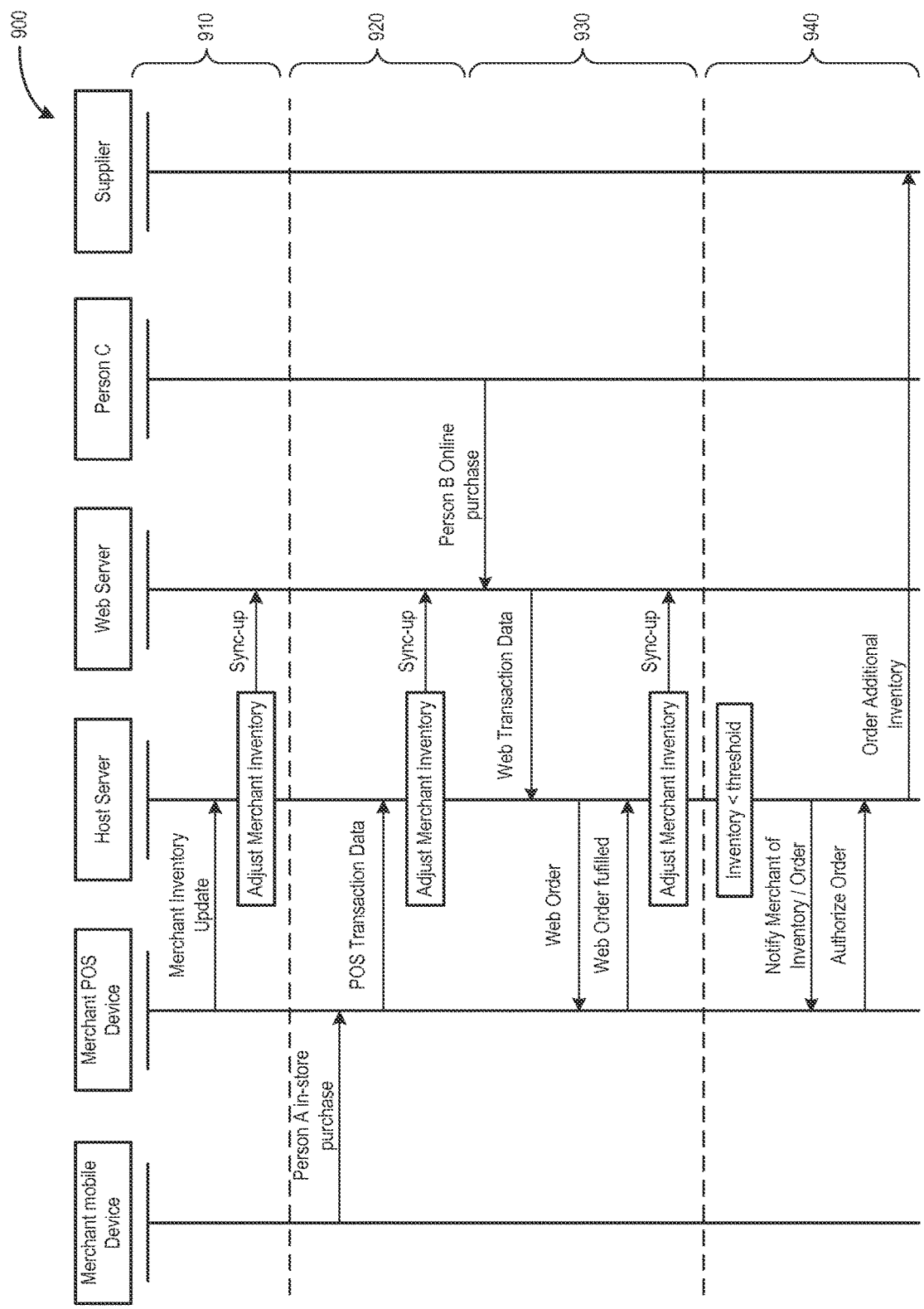
FIG. 9 depicts a sequence diagram illustrating an example of inventory management in an online environment suitable for facilitating online to offline commerce.

FIG. 9 depicts a sequence diagram 900 illustrating an example of inventory management in an online environment suitable for facilitating online to offline commerce, according to an embodiment. In particular, FIG. 9 illustrates how merchant inventory and/or a merchant website can be automatically updated. The example sequence diagram 900 is described with reference to environment 600 of FIG. 6, although other configurations are possible.

The series of sequences at 910 illustrate an example of a merchant POS device transmitting inventory update information to a host server. The inventory information may be transferred as backup or the host server may be the sole source of the information. In addition, the inventory update may be transmitted in response to new inventory arriving at the merchant location, new inventory being entered into the merchant POS device, etc. Responsive to receiving the update, the host server updates the inventory and stores the information in the merchant database. Additionally, the inventory update may automatically be synced to the web server. For example, in one embodiment, when seasonal inventory is updated at the host server, the host server may have instructions from the merchant to automatically update the website. The website may be updated to indicate the inventory or the menu may be updated to indicate that seasonal dishes are now available.

The series of sequences at 920 illustrate an example of an incremental inventory updates that occur due to offline purchases. To begin, an offline purchase or order is taken by a server using a merchant mobile device at the restaurant. The merchant mobile device passes the order information to the merchant POS device and the merchant POS device forward the transaction data to the host server. The transaction data may be pre- or post-sale. However, for real-time inventory updates, pre-sale information provides a more accurate view of real-time inventory. Responsive to receiving the update, the host server updates the inventory and stores the information in the merchant database. Additionally, the inventory update may automatically be synced to the web server.

The series of sequences at 930 illustrates an example of an incremental inventory updates that occur due to social online purchases. To begin, an online purchase or order is received at the web server from person B (e.g., to order a beer for person A, for example). The web server forwards the transaction data to the host server. The host server forwards the order to the merchant POS for ultimate approval and fulfillment. When a fulfillment message is received by the host server, the host server adjusts the inventory and syncs up appropriate website inventory.

The series of sequences at 940 illustrate an example of an auto inventory order. The host server may periodically, after every order, or after some other triggering event, compare the inventory to a threshold. If the inventory falls below the threshold, the host server triggers a notification to the merchant, and in some cases, an auto order. A merchant can set up auto order instructions in the host server. In some cases, the merchant may request to first receive an authorization request with the notification. However, in other cases the authorization request is not required.

Figure 10A:
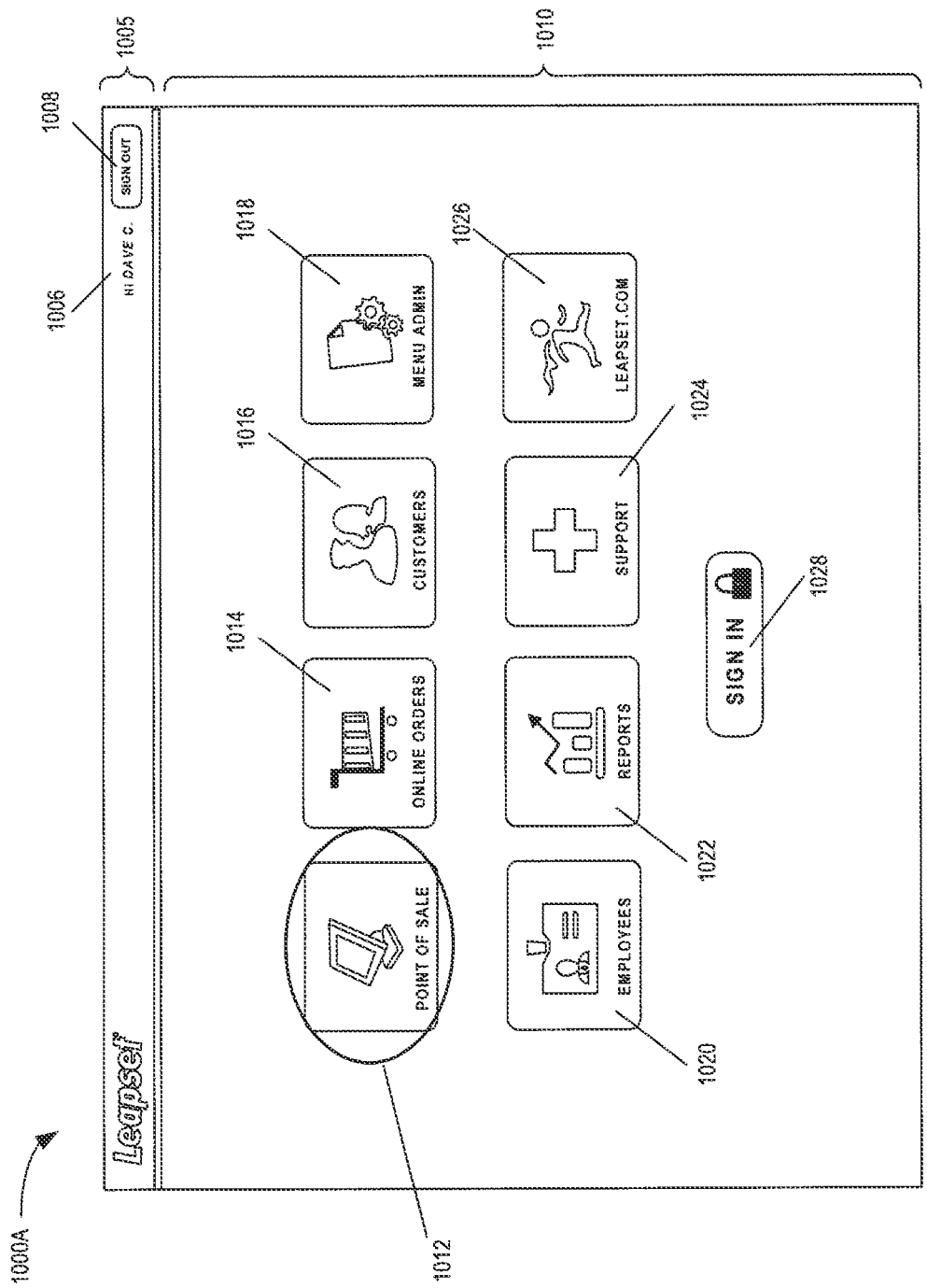
Figure 10B:
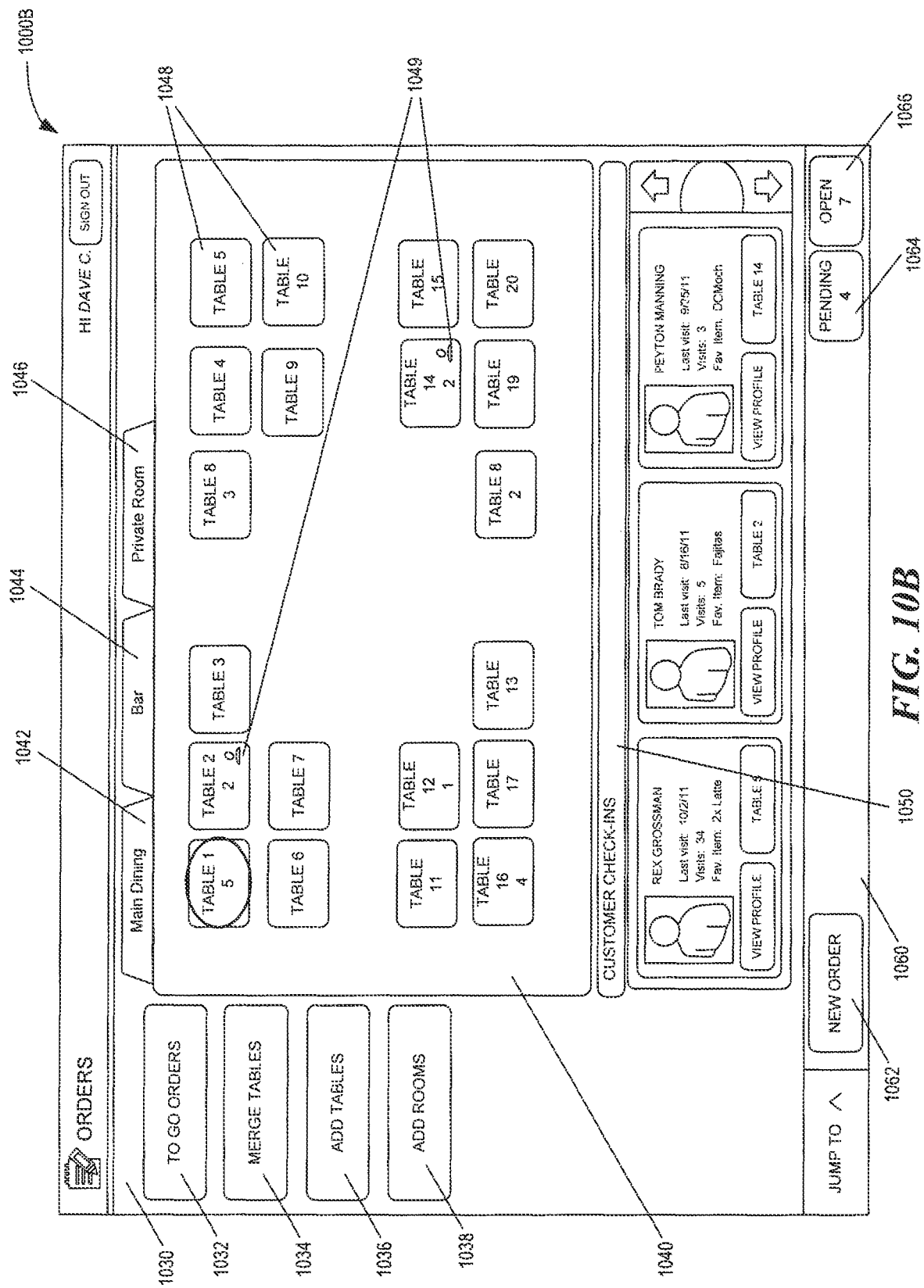
Figure 10C:
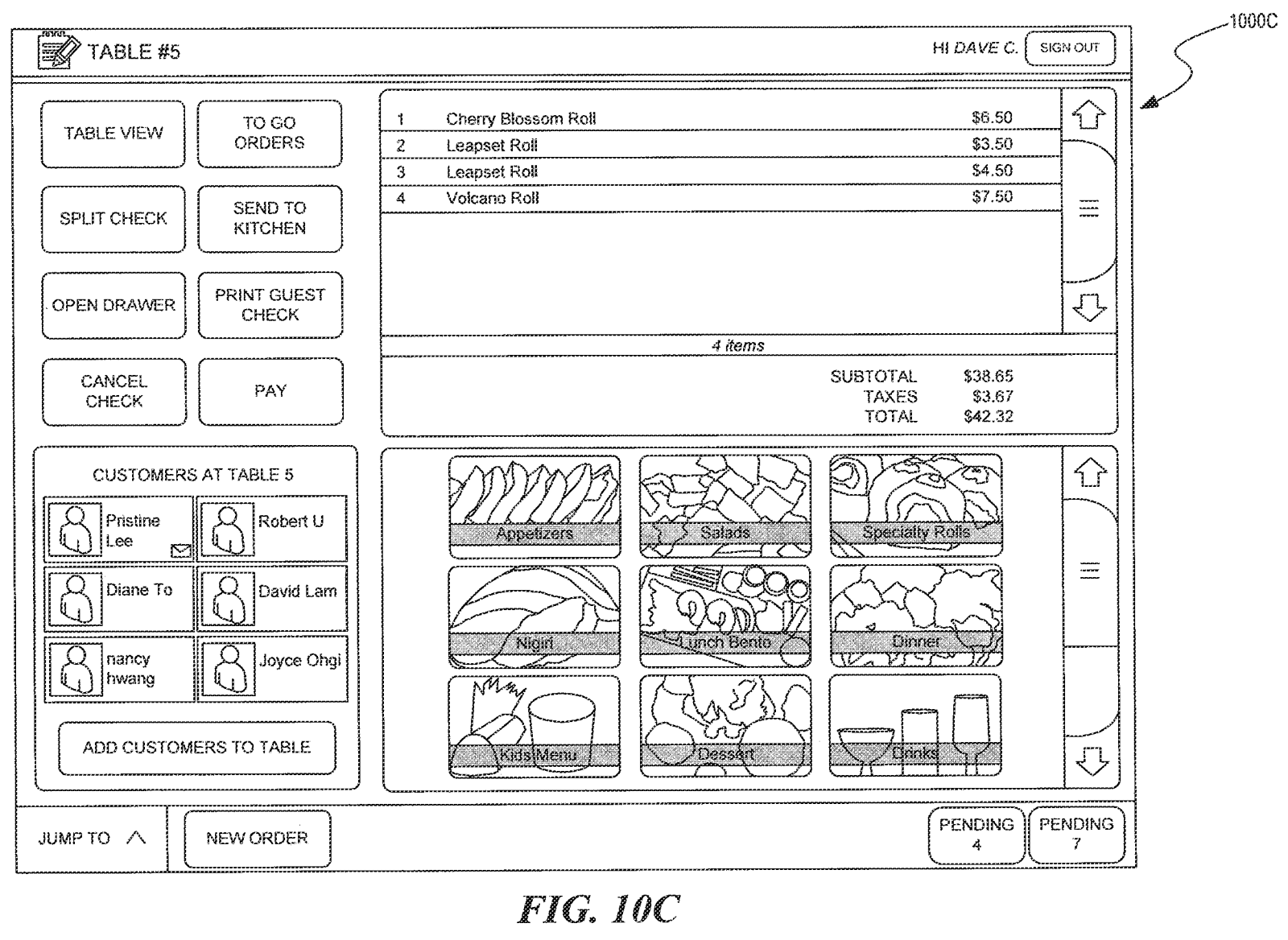

FIGS. 10A-10C depict example user interfaces illustrating the process of operating a point of sale device, according to an embodiment. Referring first to FIG. 10A which illustrates an example of a merchant POS device "home" or intro interface 1000A. In this example, the merchant POS device interface 1000A includes a status pane 1005 and a primary pane 1010. The status pane 1005 includes a "Leapset" logo, a welcome message 1006, and a sign out button 1008. When logged in, the welcome message 1006 provides a message to the user logged in to the host server. In this example, "Hi, Dave. C.," is displayed because Dave C. is currently logged in to the host server.

In this example, the primary pane 1010 includes a variety of touch activated buttons including: a point of sale button 1012, an online orders button 1014, a customer button 1016, a menu button 1018, an employee button 1020, a reports button 1022, a support button 1024, and a leapset.com button 1026. Touching any one of the buttons takes the user to a new screen that provides more information.

FIG. 10B illustrates an example of a merchant POS device POS interface 1000B. The merchant POS device will display the POS interface 1000B if, for example, a user touches the point of sale button 1012 in FIG. 10A. The POS interface 1000B includes a status pane and a primary pane similar to FIG. 10A. The primary pane includes buttons panel 1030, seating arrangement area 1040, customer check-in area 1050, and an order pane 1060.

Button panel 1030 includes buttons 1032-1038 with each button providing the described functionality when touched. For example button 1032 allows a user of the merchant POS device to view an orders screen and buttons 1034-1038 allow a user to manipulate the tables and rooms in seating arrangement area 1040. The seating arrangement area 1040 includes tabs 1042-1046 to switch between various rooms that can be created by via button 1038. Each room includes a variety of tables 1048 that can be created via button 1036 and merged via button 1034. Customers that have checked-in are indicated by graphics 1049 at the table 1048 at which they are seated. Each table may indicate whether people are seated at the table, and if so, how many.

A customer check-in area 1050 illustrates more information about the customers that have checked-ion. A profile button allows a user to view the profiled of any customer that has checked-in. The profile information may include order history, likes/dislikes, special instructions/needs, etc. Additional information such as, for example, last visit, number of visits, and favorite items may also be displayed.

The order pan 1060 includes various status buttons including a new order button 1062, a pending order button 1064, and an open order button 1066. The pending order button 1064 indicates the number of pending orders (e.g., those orders that have been received but not yet approved by the merchant) and the open order button 1066 indicates the number of open orders (e.g., orders received and approved). Touching either button takes the user to a more detailed screen illustrating the respective pending (FIG. 11E) or open (FIG. 11G) orders.

FIG. 10C illustrates an example of a merchant POS device POS interface 1000C. The merchant POS device will display the POS interface 1000C if, for example, a user touches table 5 on FIG. 10B. FIG. 1000C provides additional details about the individuals and order associated with table 5. In addition, controls are provided to for payment and returning to other interfaces.

Figure 11B:
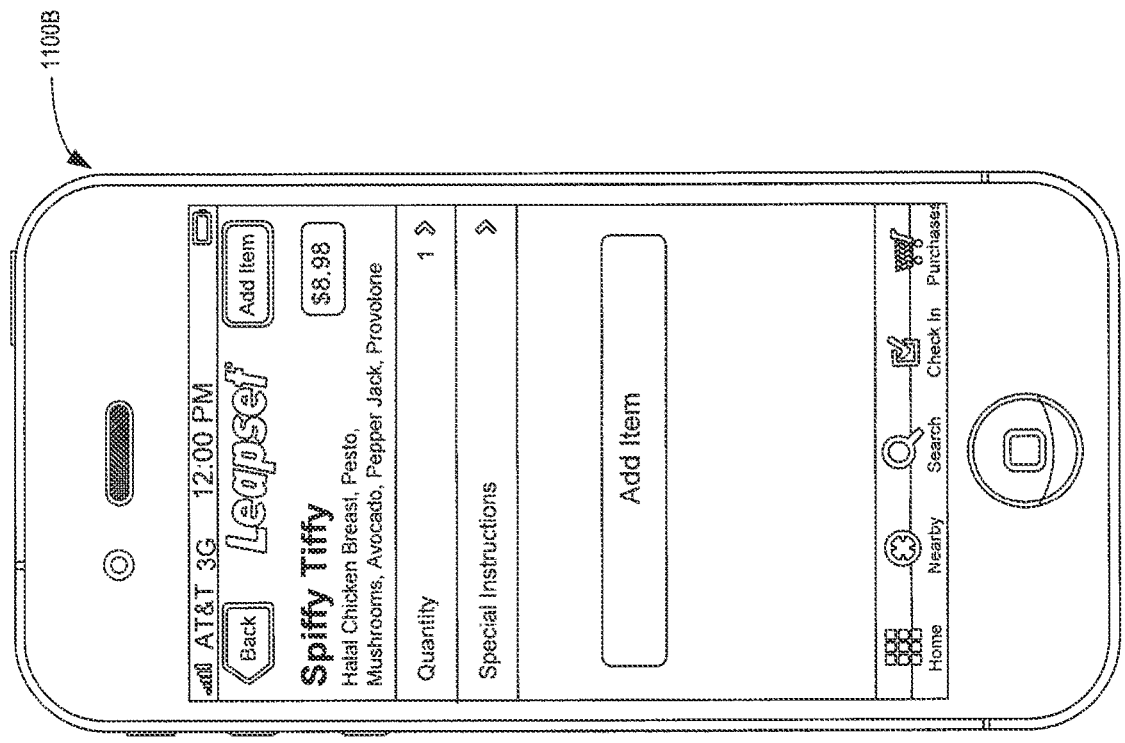
Figure 11A:
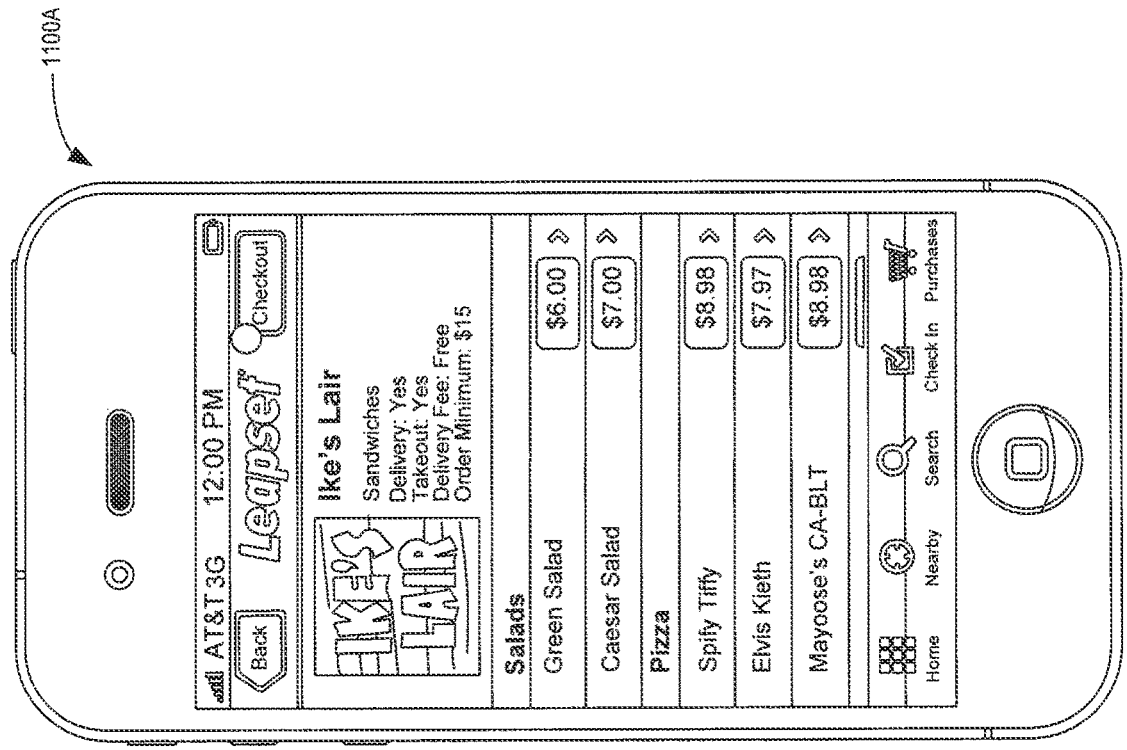

FIGS. 11A-111H depict example user interfaces illustrating the process of online ordering from the perspective of a mobile client device and a point of sale device, according to an embodiment.

Figure 11C:
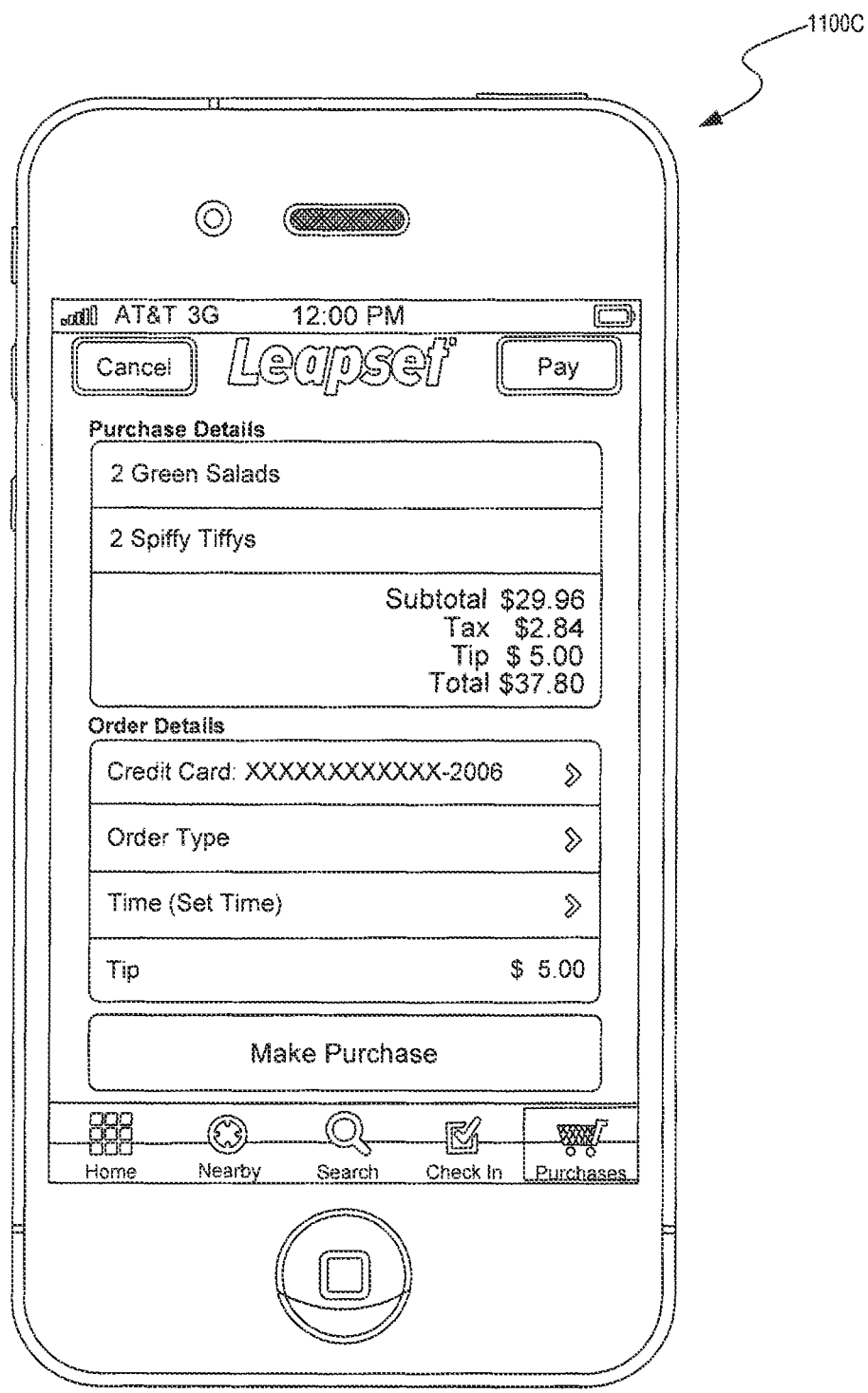

Referring first to FIGS. 11A-11C which illustrate examples of the mobile online ordering interface 1100A, 1100B, and 1100C, respectively. When using the mobile online interface, a user must first login to the host server using a mobile client device. In the example of FIGS. 11A, 11B, and 11C, the user or customer has identified a Leapset affiliate restaurant called "Ike's Lair." As shown, a user can browse menu items, order, enter special instructions, and make a purchase using the mobile online ordering interfaces 1100A, 1100B, and 1100C.

Figure 11D:
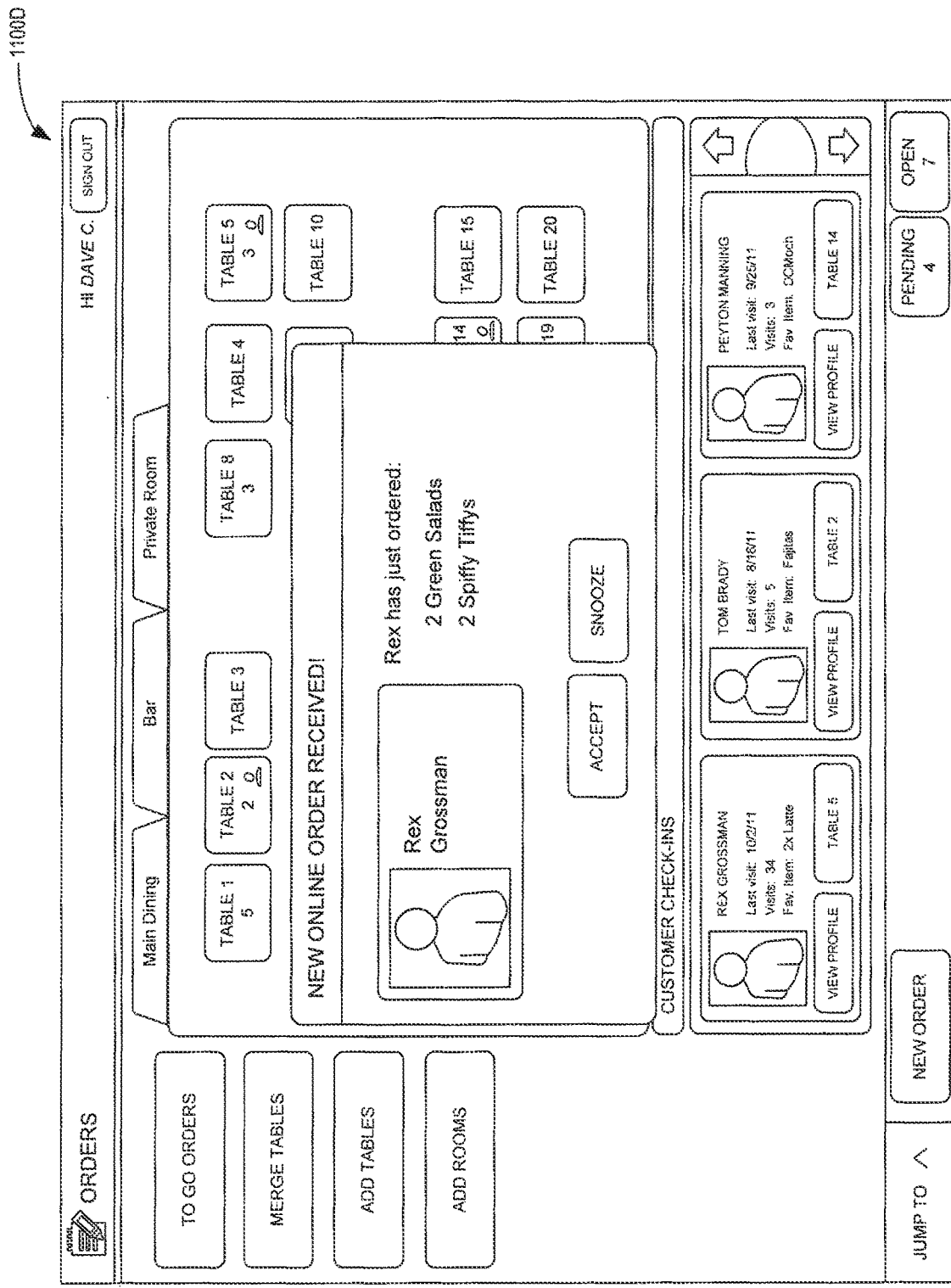
Figure 11E:
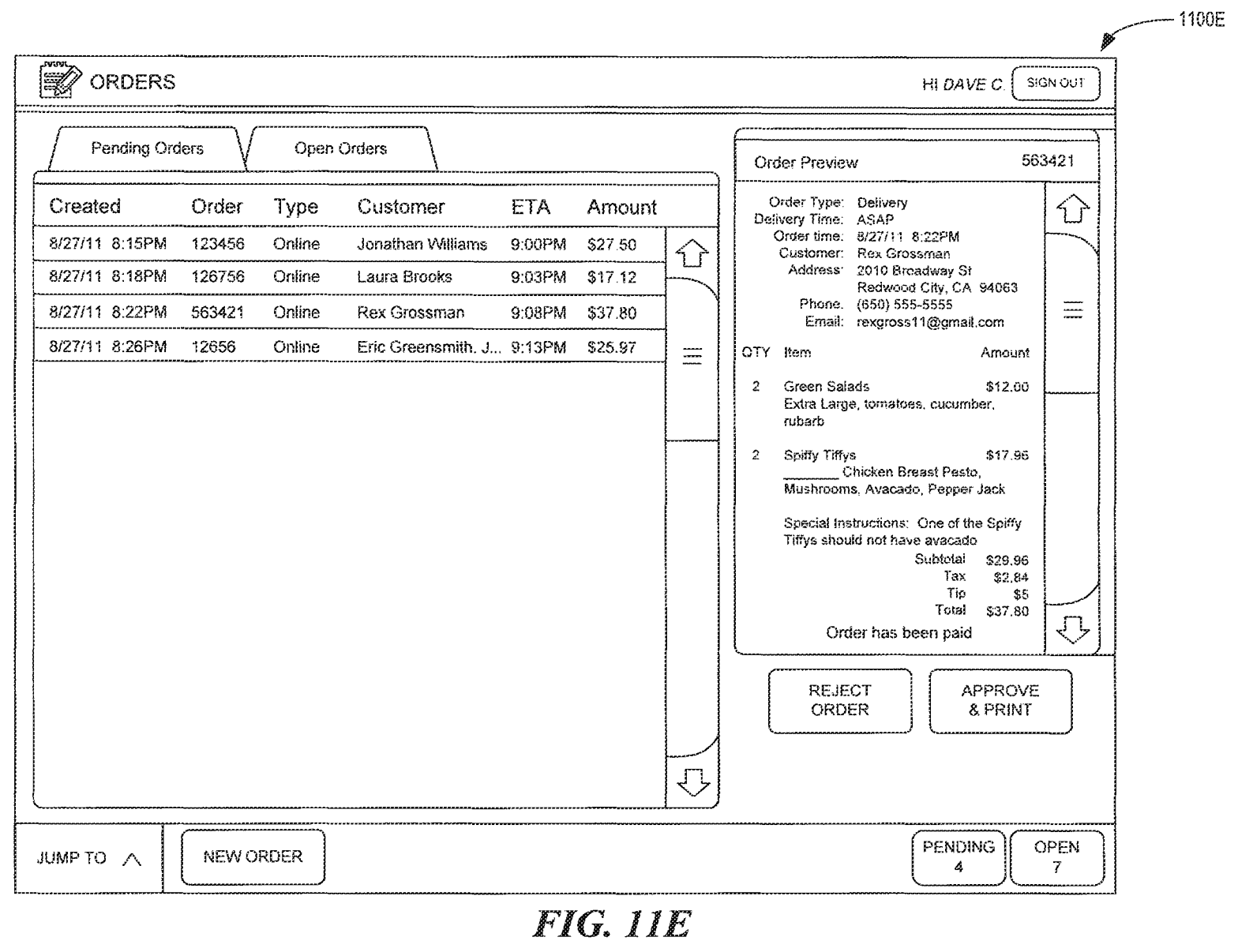

FIGS. 11D and 11E illustrate examples of the merchant POS device interfaces 1100D and 1100E, when an online order is received (e.g., the order place in FIG. 11C). A user of the merchant POS device can accept the order and begin processing the order or snooze the acceptance of the order for some period of time (e.g., if busy processing an offline order). If an order is accepted via merchant POS device interface 1100D, then the new online order becomes a pending order.

In some embodiments, pending orders can still be approved or rejected as shown in merchant POS device interface 1100E. FIG. 11F illustrates an example of the mobile online ordering interface 1100F displayed to a customer once the order has been accepted by the merchant. FIG. 11G illustrates an example of the merchant POS device interface once a pending order has been accepted. In once pending orders are accepted, they become open orders. Once an open order is ready a user of the merchant POS device interface hits the "order ready" button and a notification is sent to the online mobile user.

FIG. 11G illustrates an example of the mobile online ordering interface 1100H that displayed to a customer on the mobile client device when the user's order is ready. The mobile client device receives a notification when the order is ready. In response to receiving the notification, the mobile client device displays the mobile online ordering interface 1100H which, in some embodiments, provides a user with a directions button allowing the user to calculate directions to the restaurant from a current location.

Figure 12B:
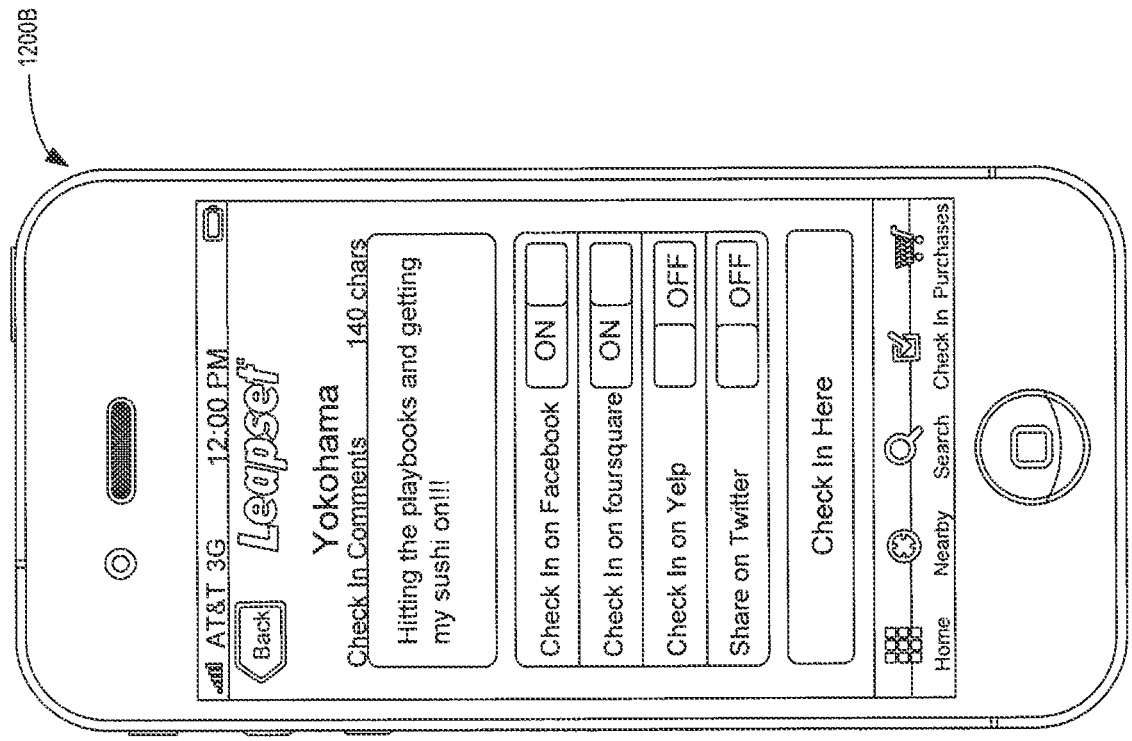
Figure 12A:
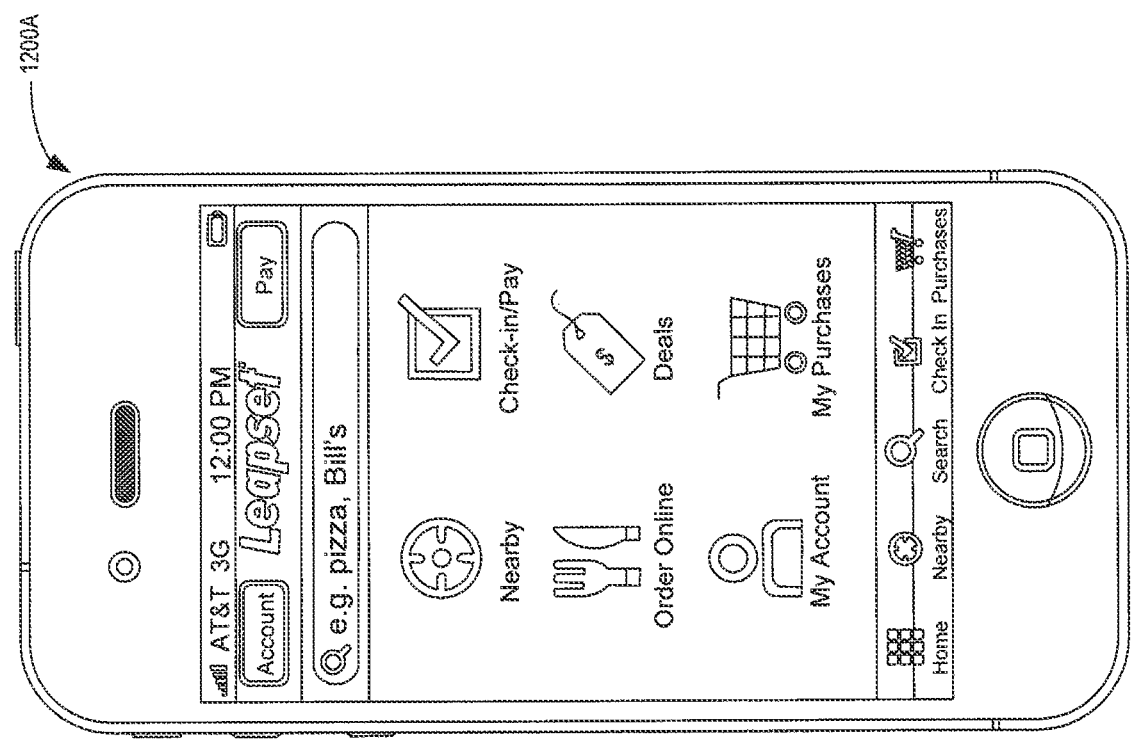

FIGS. 12A-12J depict example user interfaces illustrating the process of checking in via the in-store experience from the perspective of a mobile client device and a point of sale device, according to an embodiment. Referring first to FIGS. 12A and 12B which illustrate examples of the mobile online ordering interface 1200A, and 1200B, respectively. In one example, when a user logs onto the host server or launches the host server application on a mobile client device, the mobile online ordering interface 1200A is displayed. The mobile online ordering interface 1200A includes a plurality of buttons, a search engine, an account button to take the user to his/her personal account, and a pay button. Moreover, some or all of the mobile online ordering interfaces, including interface 1200A, include a footer bar including, for example, the following button: home, nearby places, search, check-in, and purchase. The main pane of the mobile online ordering interface 1200A also includes buttons for nearby locations, online ordering, account, check-in pay, local deals, and purchases (e.g., history).

In one example of operation, the check-in button will be highlighted when a user is at a merchant that provides for host services. If a customer chooses to check-in to a merchant location by selecting the check-in button or check-in pay button, then the mobile online ordering interface 1200B is displayed. The mobile online ordering interface 1200B allows a user to provide a status update (e.g., comments) and choose from a variety of social networks to check-in (e.g., via slidebar buttons). When ready, the customer selects the "check-in here" button.

Figure 12C:
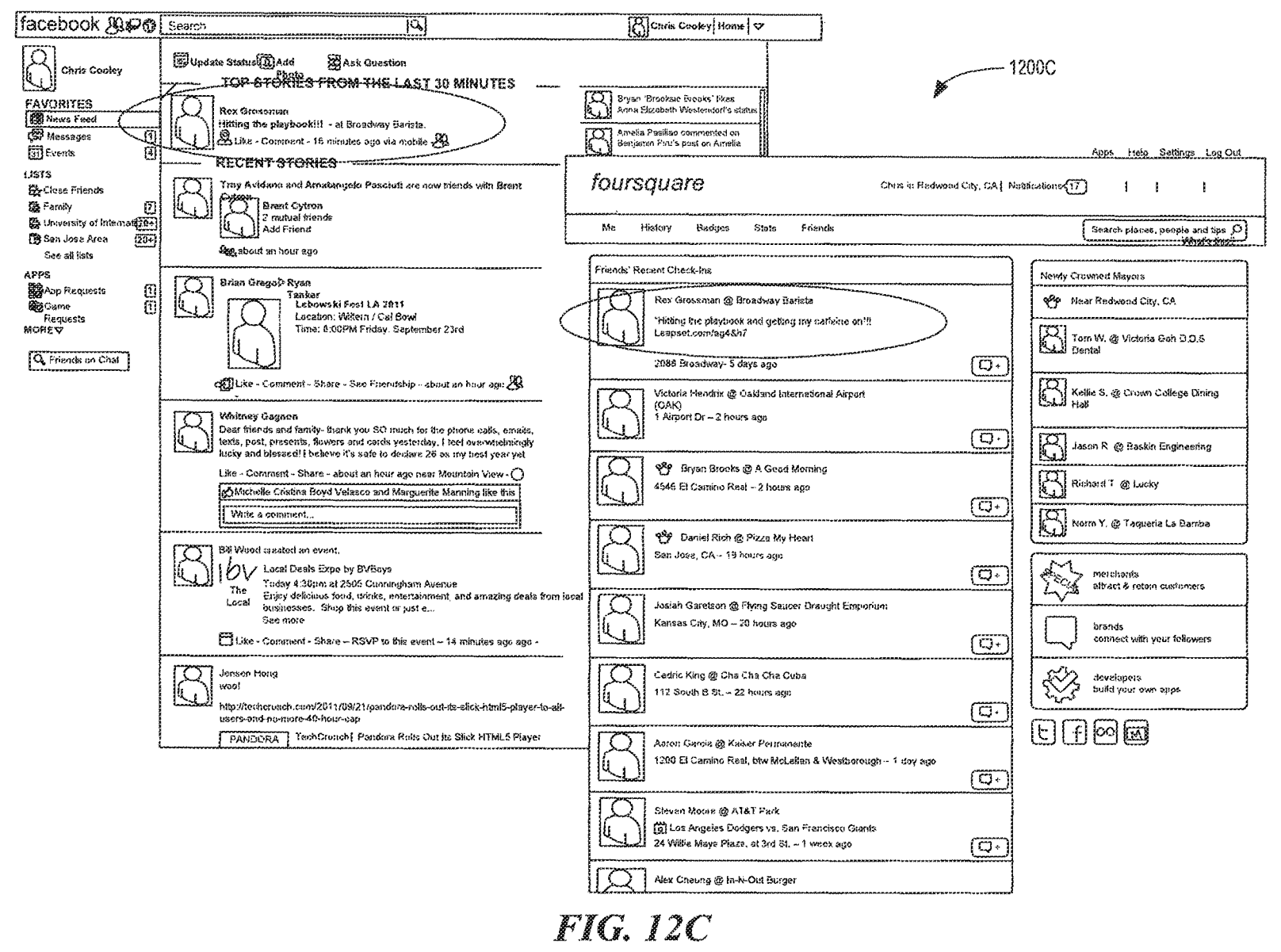
Figure 12D:
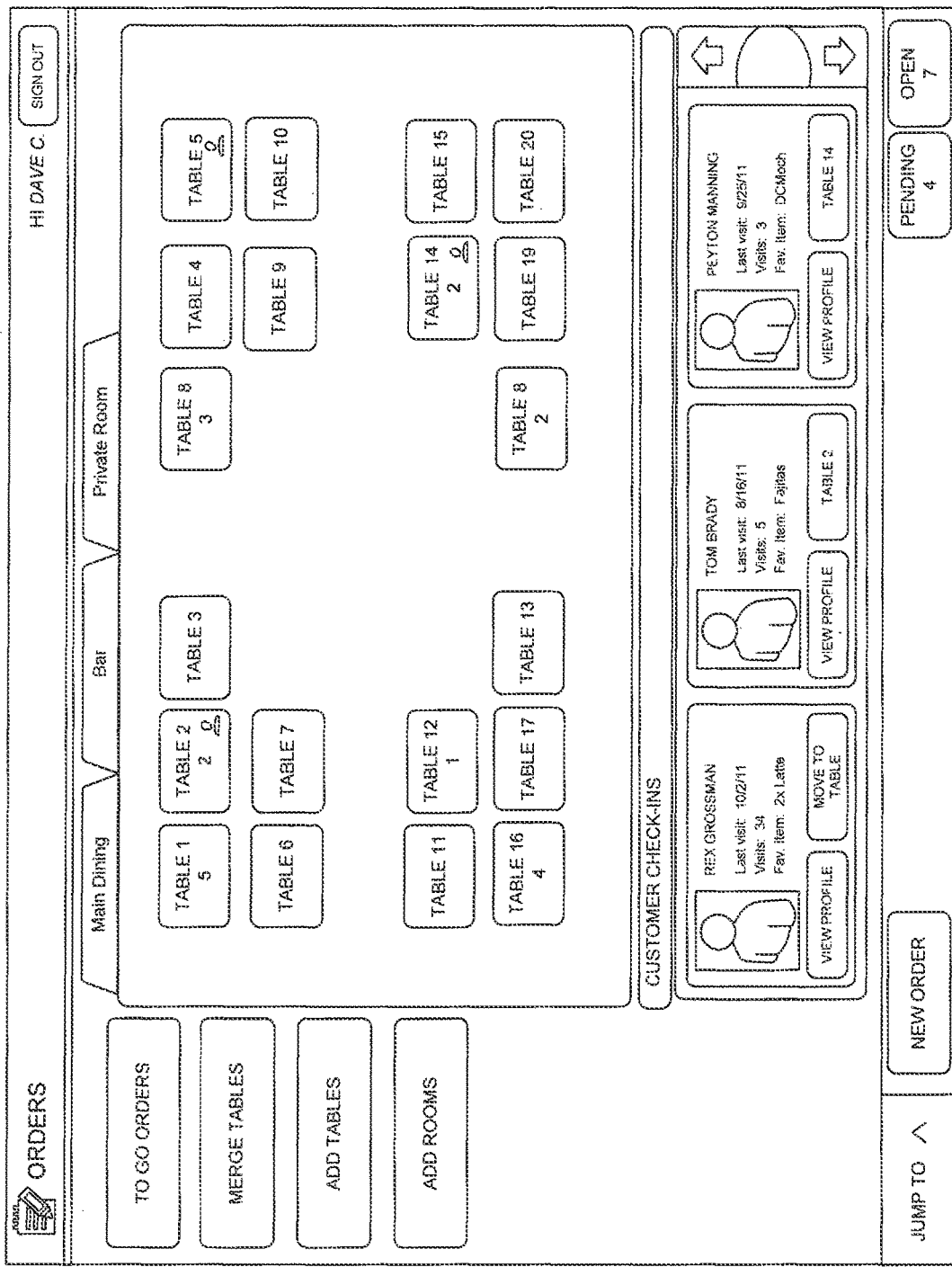
Figure 12E:
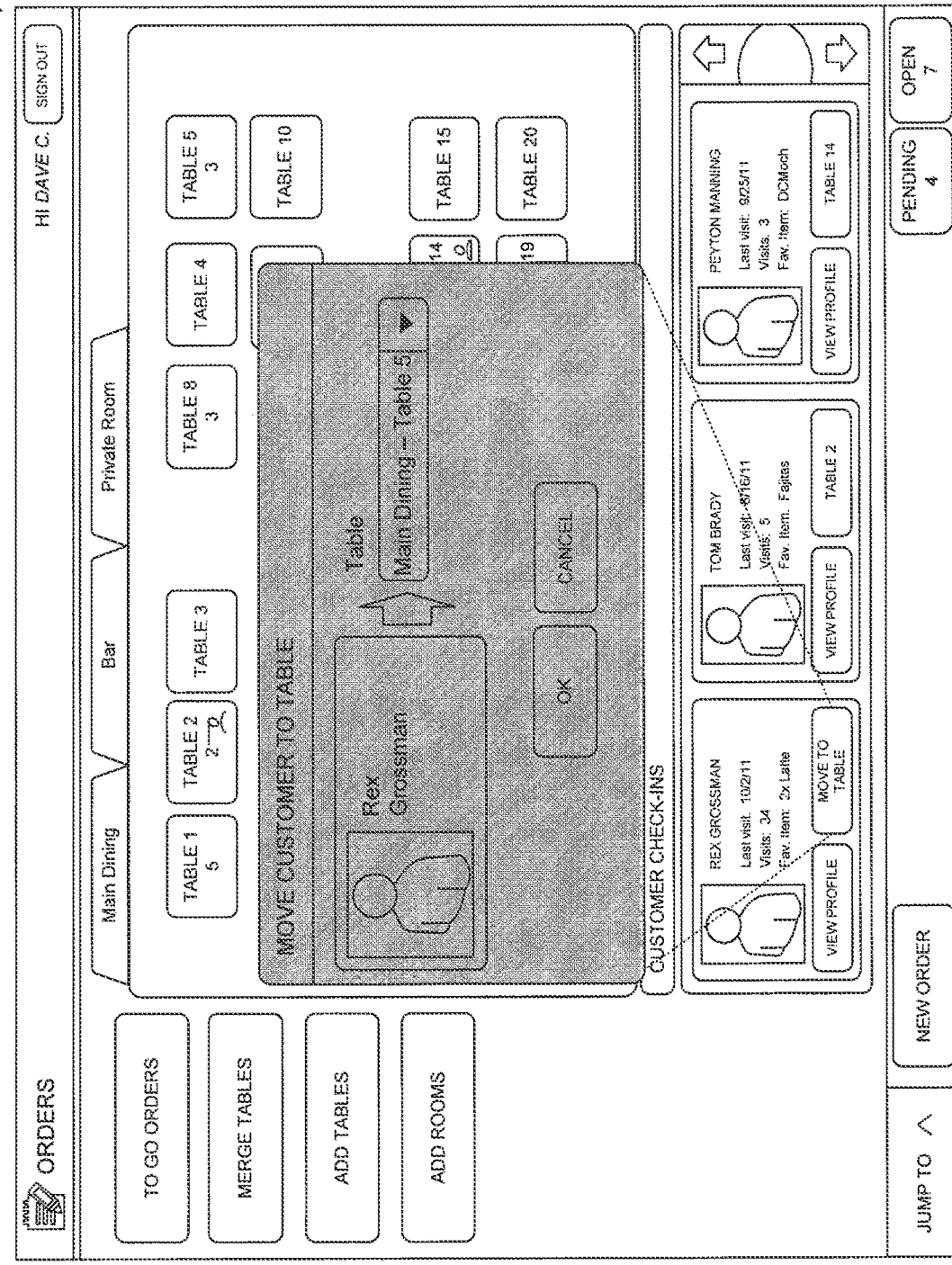
Figure 12F:
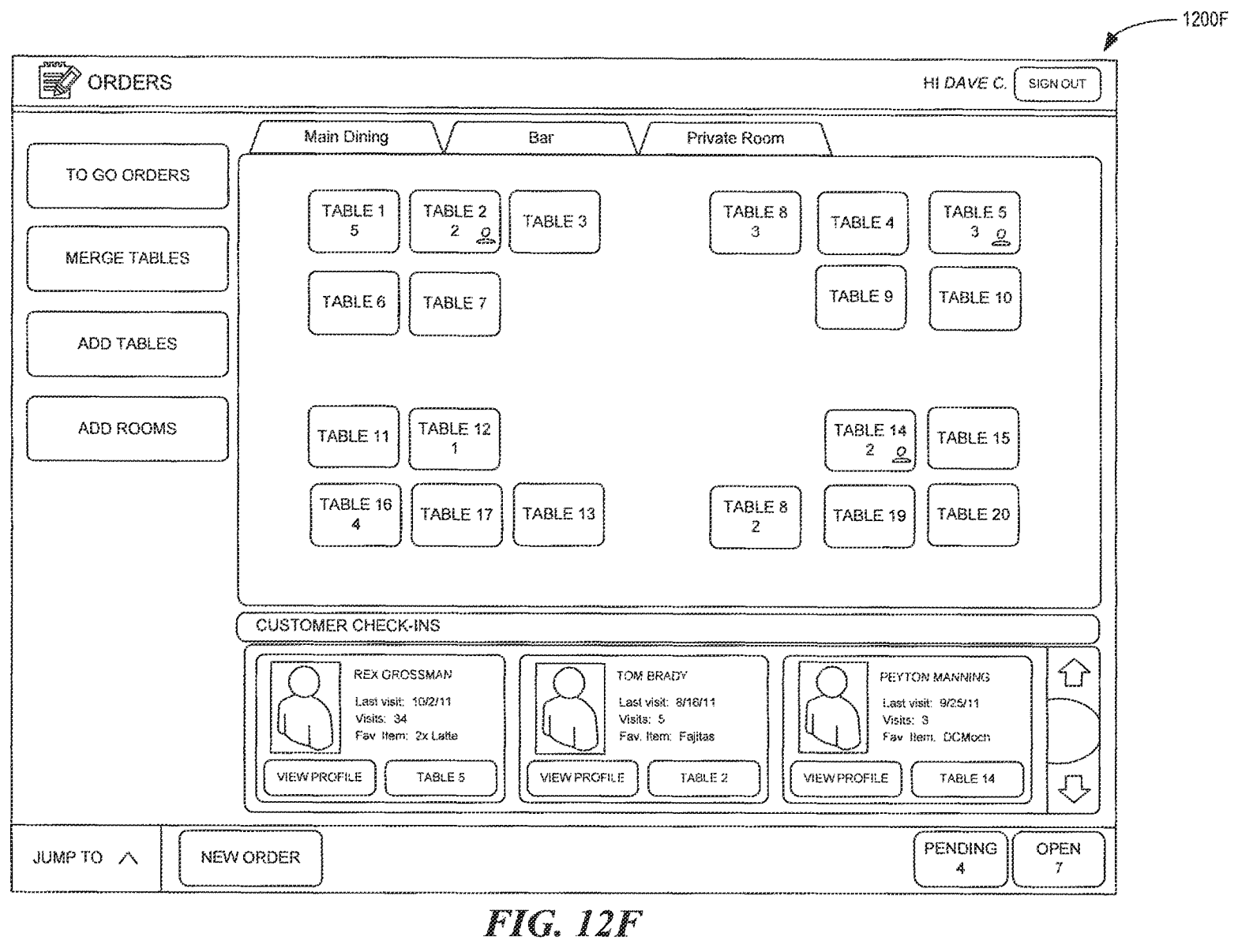

FIG. 12C illustrates an example of social feeds 1200C. In particular, the customer's friends may see, for example, social feeds 1200C in their social network feeds after a customer has checked-in at a merchant location. FIG. 12D illustrates an example of a merchant POS device POS interface 1200D. POS interface 1200D illustrates the interface displayed on the merchant POS device after the customer has checked-in. As shown in FIG. 12E, a user of the of a merchant POS device can select a table when a customer checks-in. Further, in some embodiments, customers that have checked-in but are not seated in the seating area can be seated in the order in which they checked-in. At seating, the user of the merchant POS device can move the checked-in user to a table. FIG. 12F illustrates an example of a merchant POS device interface 1200F with an indicator at table 5 that a checked-in customer is sitting there after having been moved to the table.

Figure 12G:
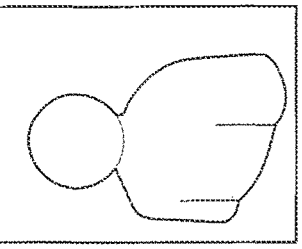

FIG. 12G illustrates an example of a merchant POS device interface 1200G showing profile information of a customer. The profile information can be displayed on the merchant POS device interface by, for example, selected the "view profile" button in the customer check-in area of FIG. 12F. Alternatively or additionally, the profile information can be viewed by selecting the "customers" button on the main or home page (e.g., FIG. 10A).

Figure 12H:
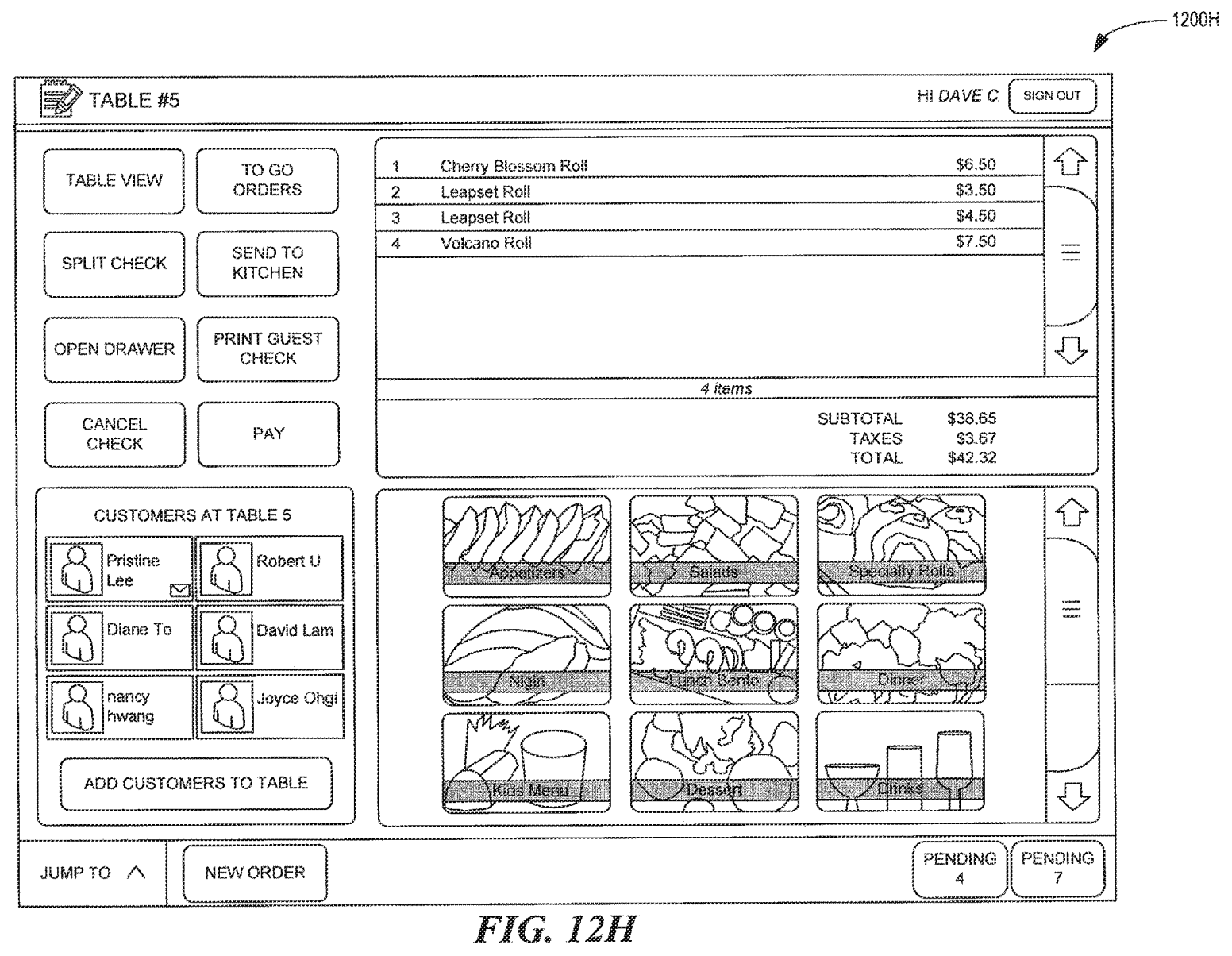

FIG. 12H illustrates an example of a merchant POS device interface 1200H showing table level information (e.g., table 5). A letter or envelope next to a customer may indicate that this party has checked-in to view, modify and/or view, modify, and pay the bill. FIGS. 12I-12J illustrate an example of mobile client device interfaces 1200I and 12OOI illustrating the process and ability to view and pay for the bill via the mobile client device. For example, a mobile customer may view an itemized list, add tip, pay, email the receipt, and/or print the receipt.

FIGS. 13A-13E depict example user interfaces illustrating the process of social ordering from the perspective of mobile client device, the online social ordering device, and a merchant point of sale device, according to an embodiment.

Figure 13A:
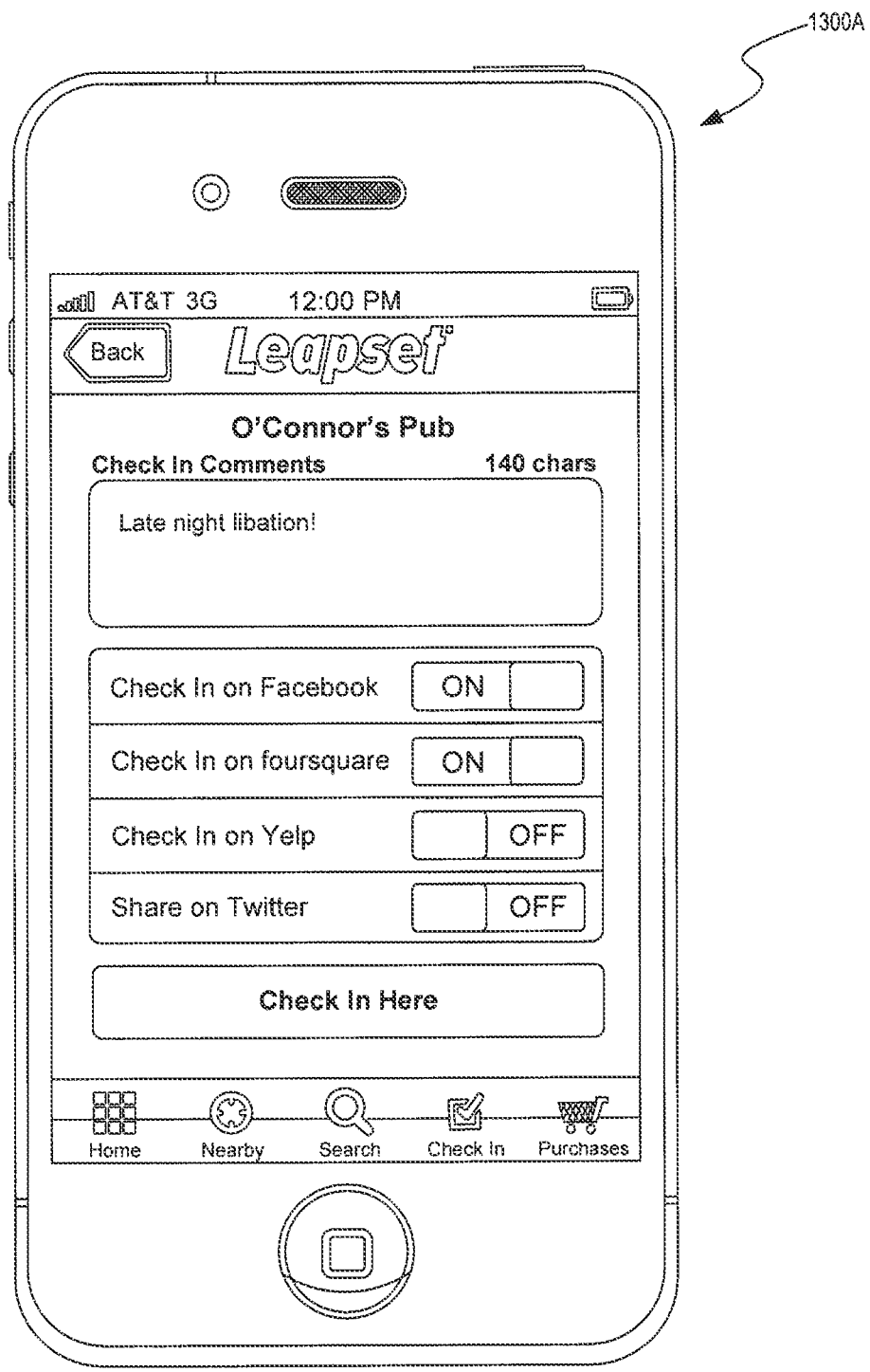
Figure 13B:
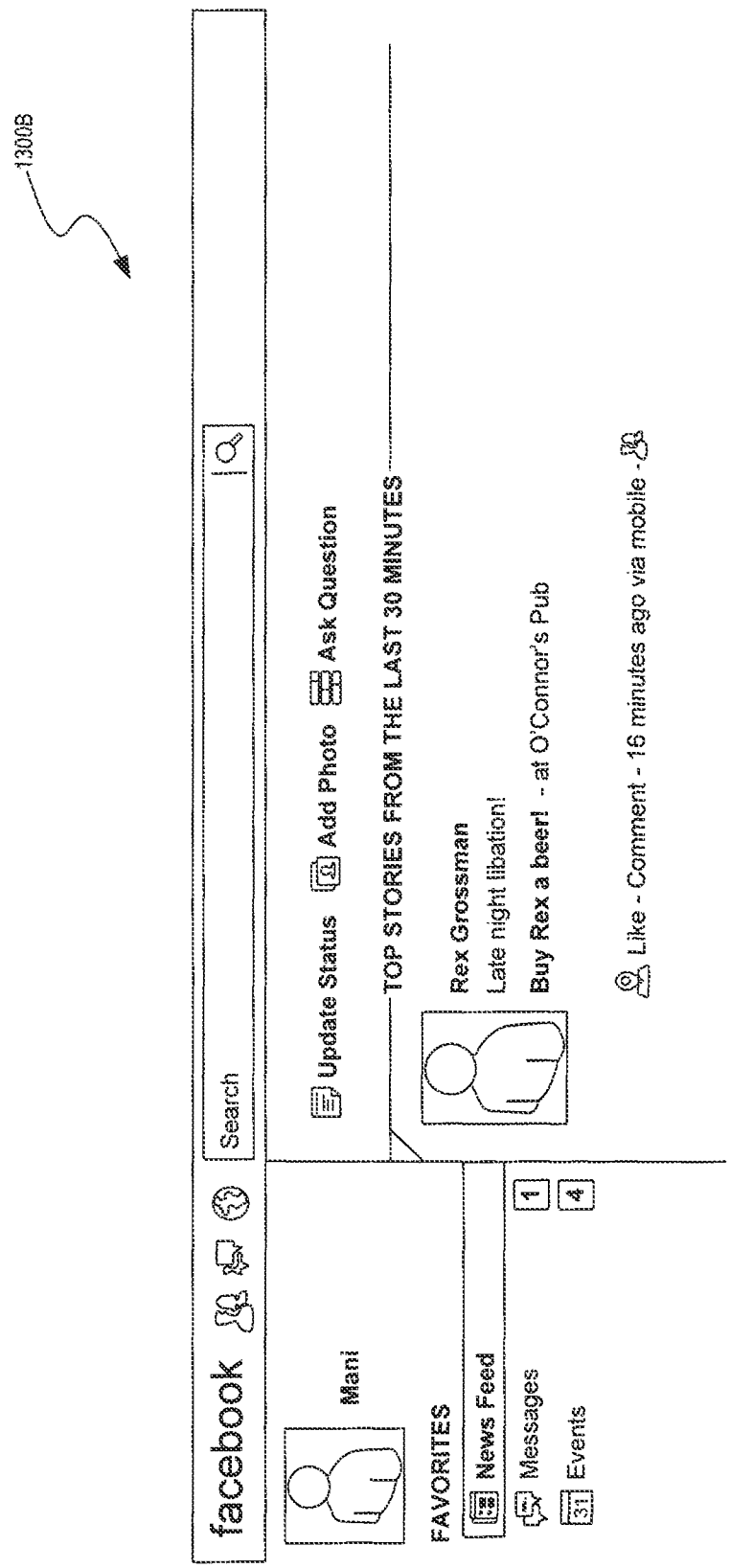
Figure 13C:
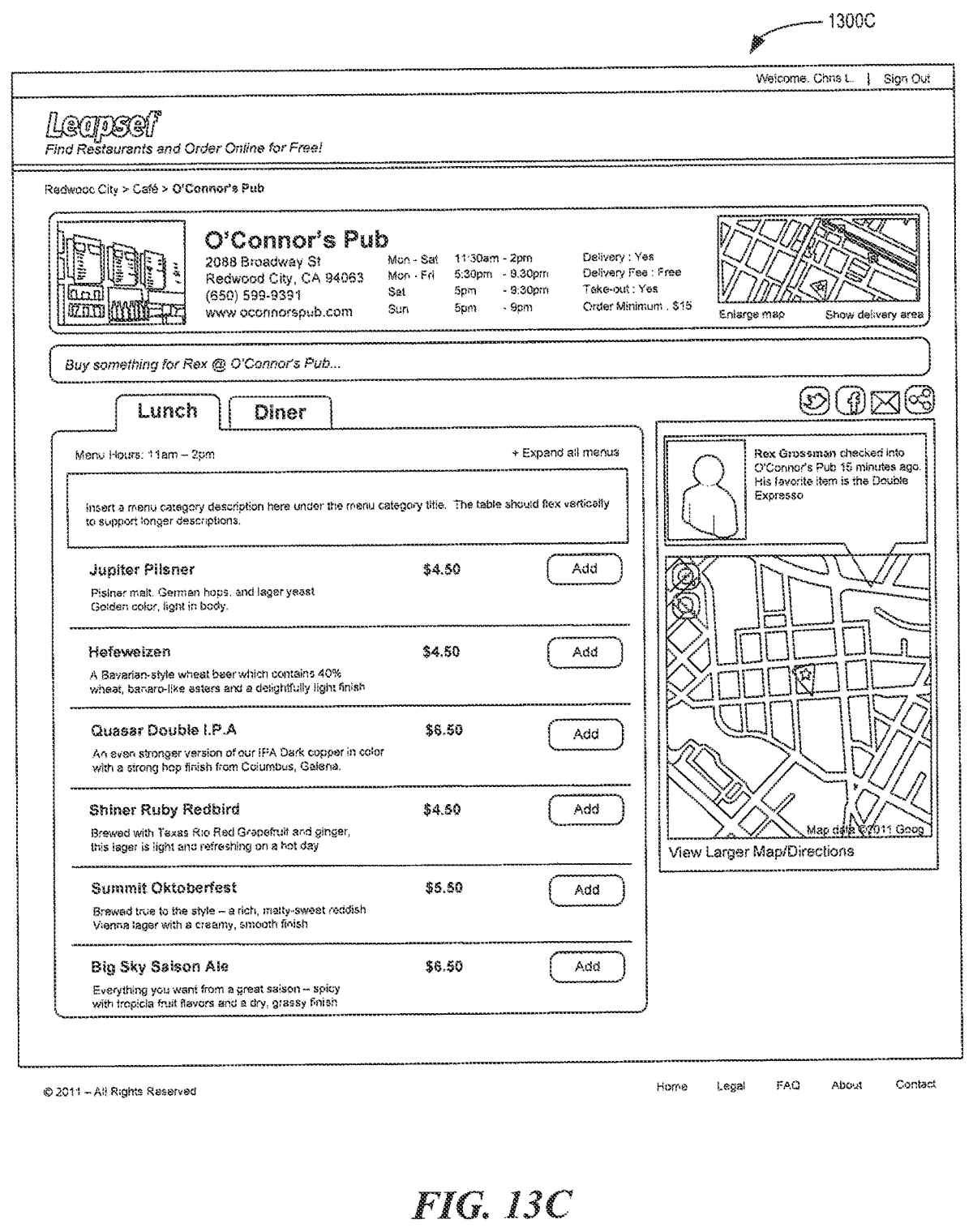

FIG. 13A illustrates an example user interface illustrating the process of checking in via the in-store experience from the perspective of a mobile client device. As previously discussed, the user of the mobile client device can enter comments and select one or more social web networks on which to check-in (i.e., share status and/or location information). FIG. 13B illustrates an example of one of the shared social feeds 1300C. In this case, there is also a "Buy Rex a beer!" link that allows an online friend of Rex's follow the link and commence a social order for a friend. If a friend does clicks on the link, they may be taken to the host server web interface where they are presented with a menu of options as shown in FIG. 13C.

Figure 13D:
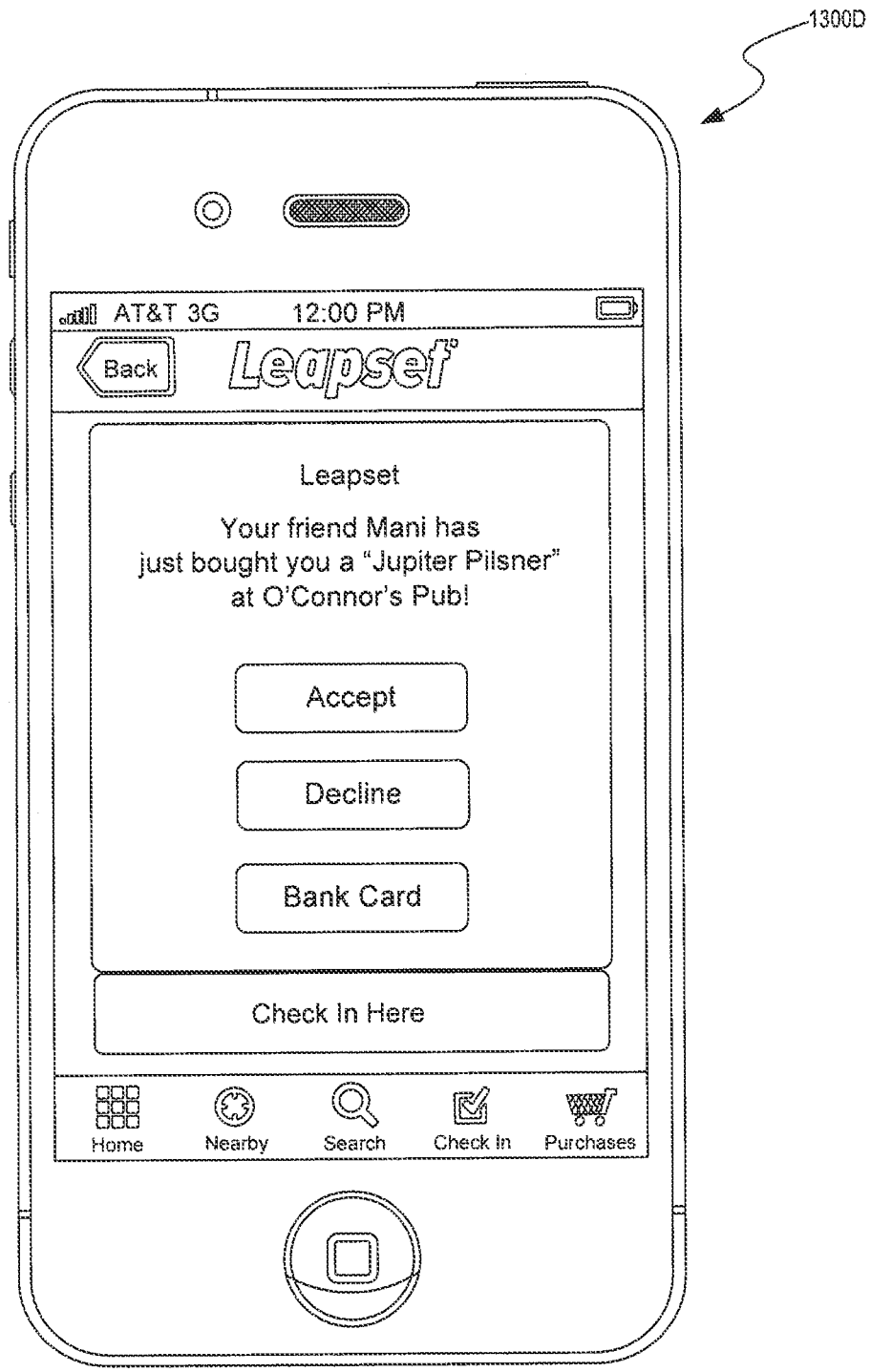
Figure 13E:
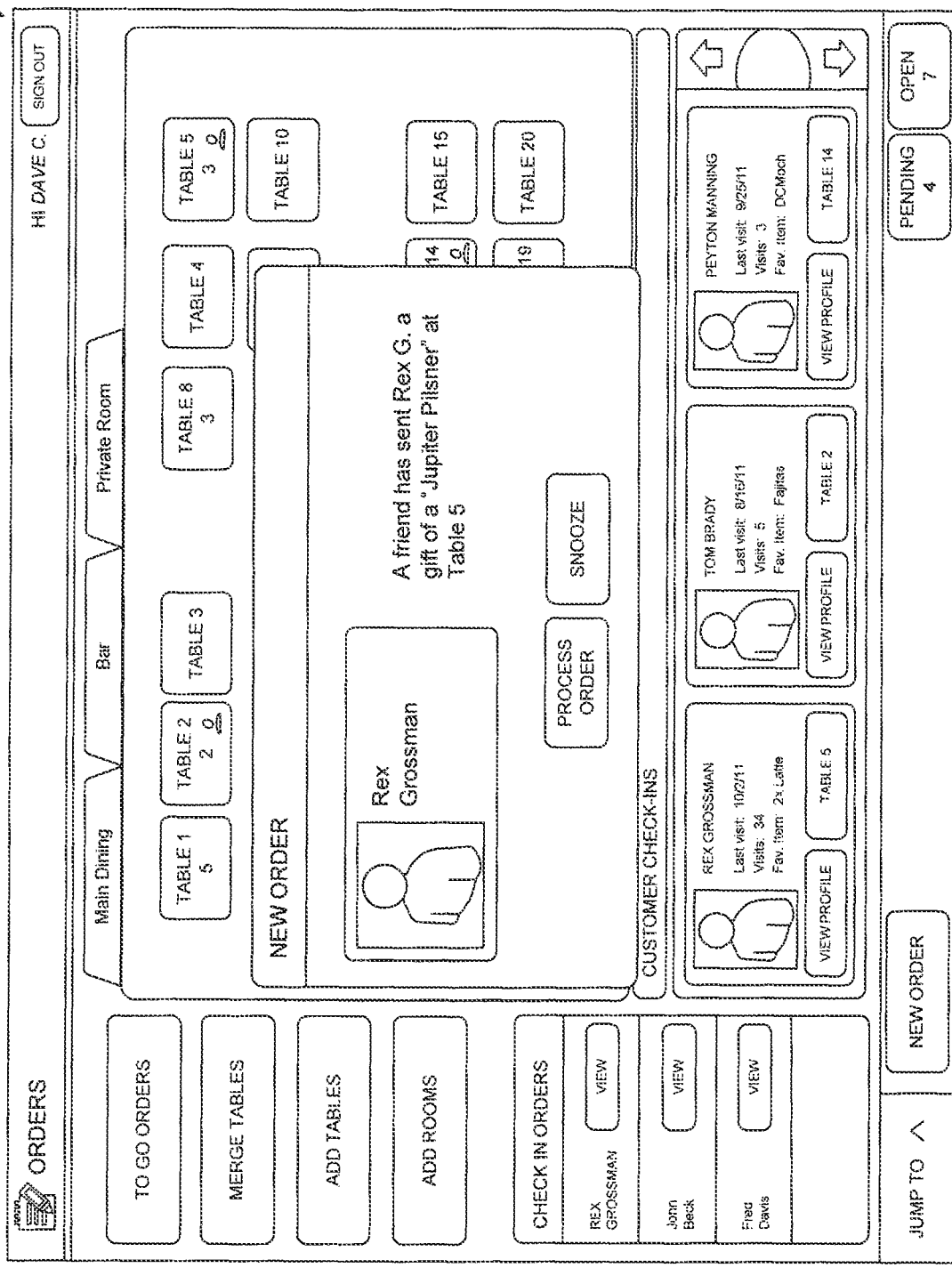

FIG. 13D illustrates an example user interface illustrating the message that the checked-in party (e.g., Rex) receives from the perspective of a mobile client device. As previously discussed, the user of the mobile client device can accept, decline, or bank card (or simply bank) the gift. FIG. 13E illustrates an example user interface illustrating the indication received at the merchant point of sale device. In some embodiments, the merchant will only receive this notification if the gift is accepted at the merchant location.

Figure 14:
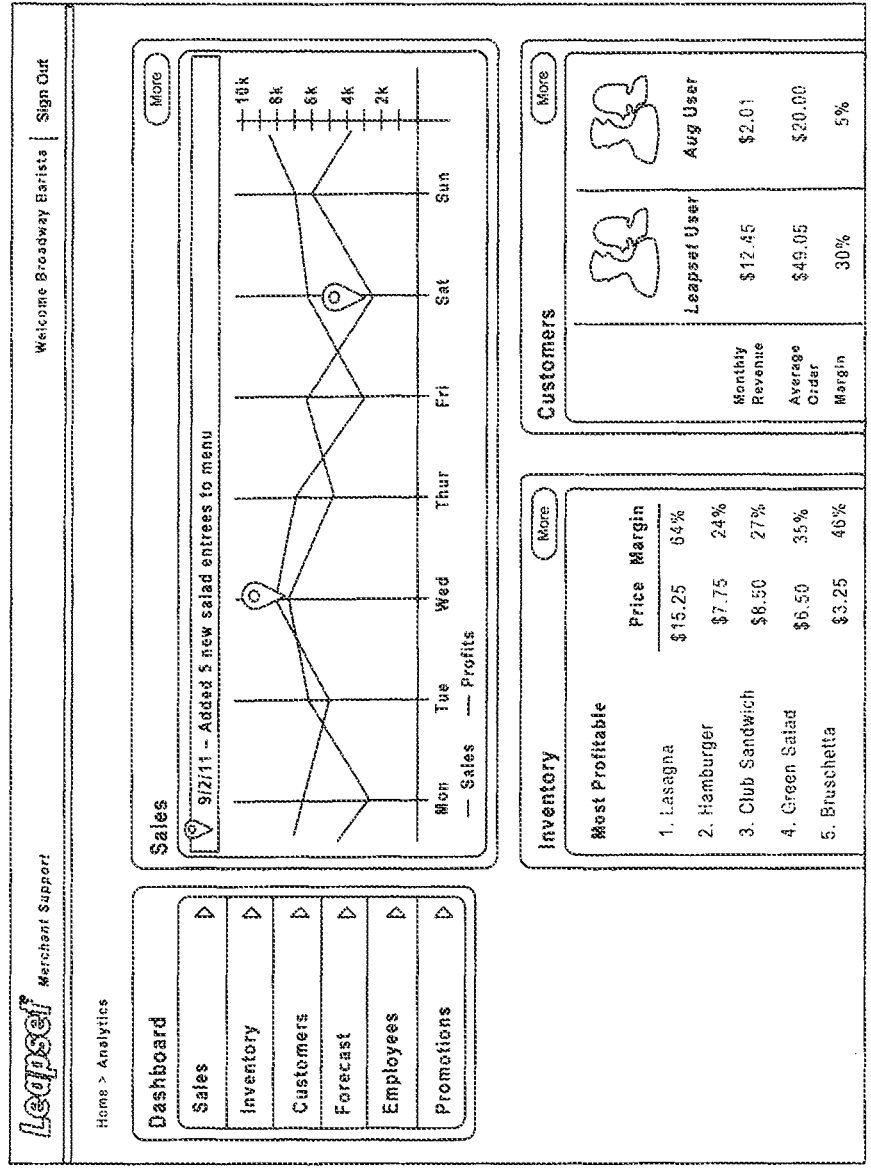
FIG. 14 depicts an example user interfaces illustrating a sample analytics report displayed on a point of sale device.

FIG. 14 depicts an example user interfaces illustrating a sample analytics report 1400 displayed on a point of sale device, according to an embodiment. A user of a merchant point of sale device may access reports by selecting the reports button on the home or main menu shown in FIG. 10A. A variety of analytics may be available to merchants. For example, sales, inventory, customers, forecasts, employees, and promotions may be analyzed and reports generated by the host server for enhanced comprehension.

Figure 15:
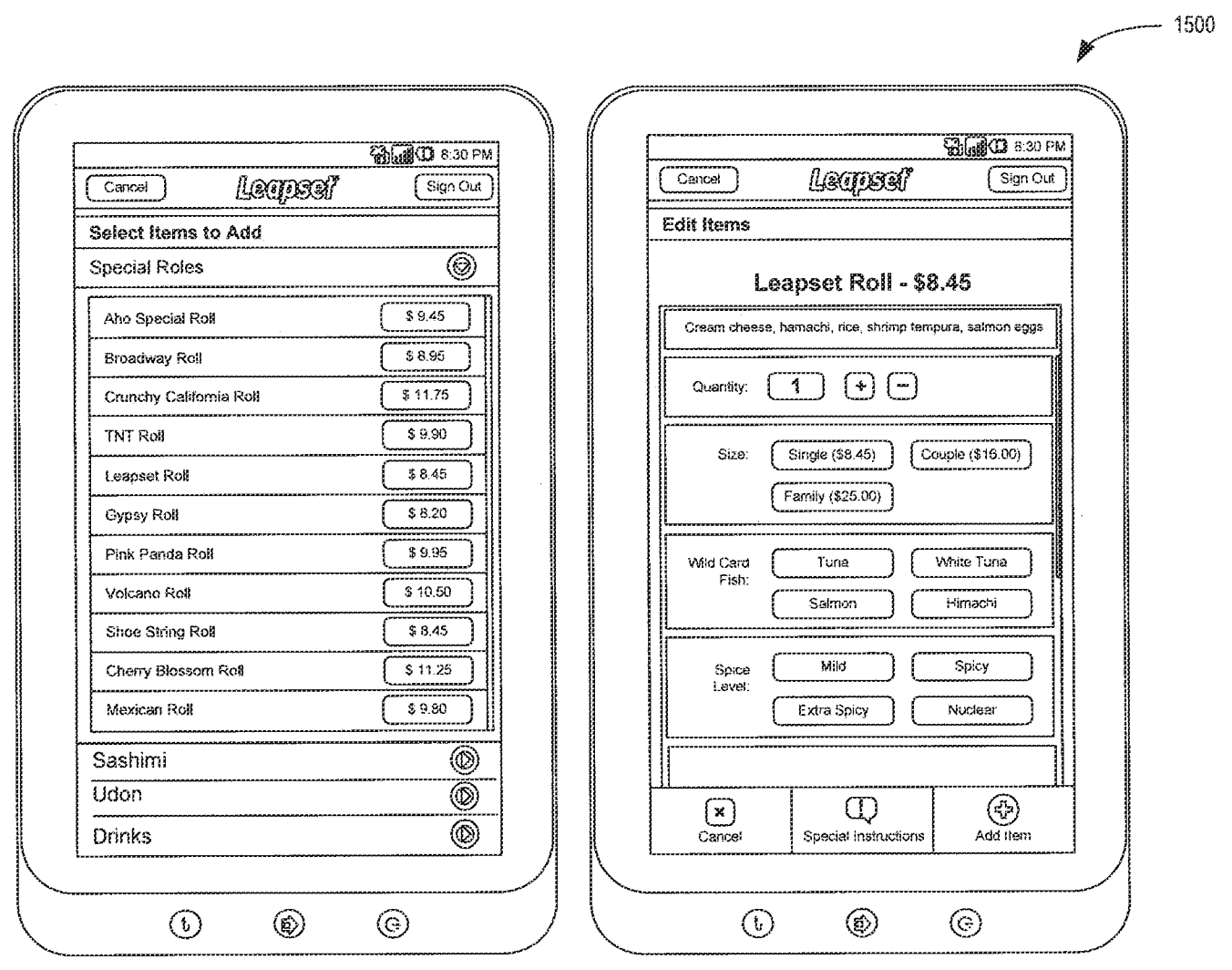

FIG. 15 depicts an example user interfaces illustrating the process of offline (in-store) ordering from the perspective of the merchant mobile devices, according to an embodiment. It is appreciated that each merchant may have any number of mobile management device in communication with the host server, or in some cases, none at all.

Figure 16:
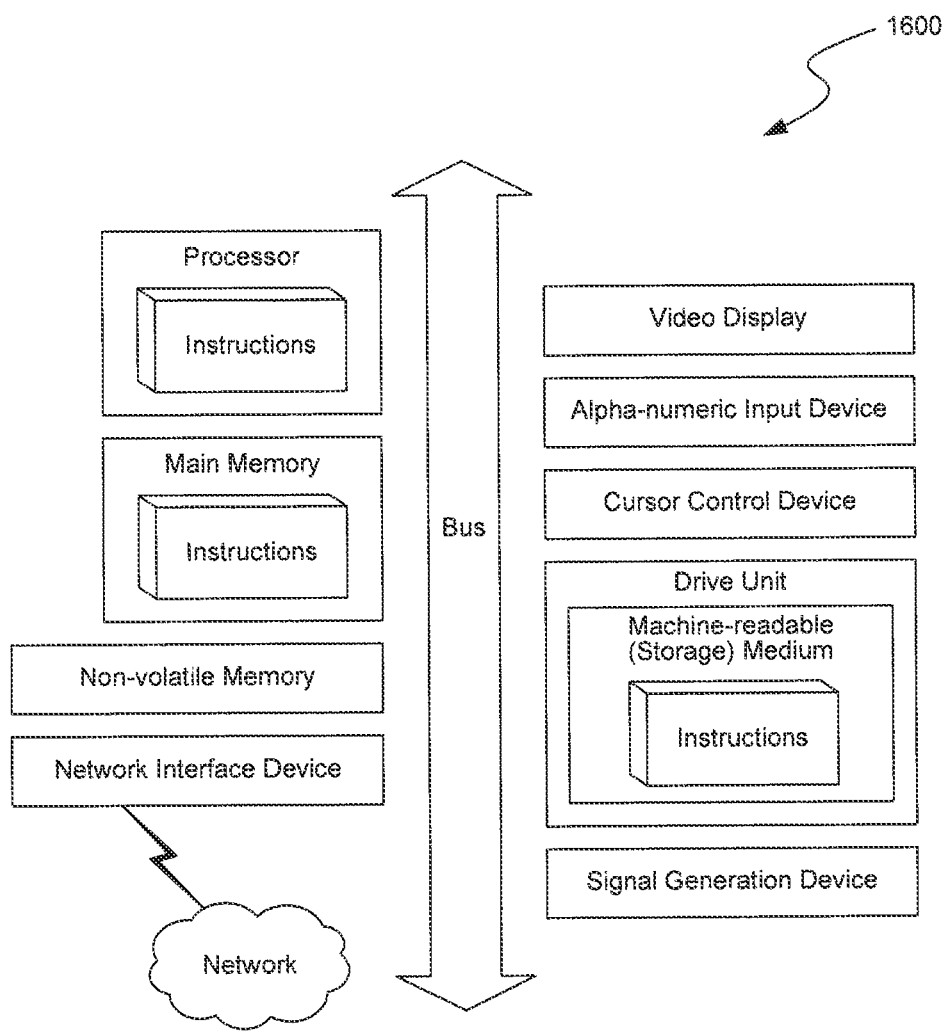
FIG. 16 depicts a diagrammatic representation of a machine in the example form of a computer system within which a set of instructions, for causing the machine to perform any one or more of the methodologies discussed herein, may be executed.

FIG. 16 shows a diagrammatic representation of a machine in the example form of a computer system 1600 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone or smart phone, a tablet computer, a personal computer, a web appliance, a point of sale device, a network router, switch or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (e.g., a centralized or distributed database, and/or associated caches and servers) that store the one or more sets of instructions. The term "machine-readable medium" or "machine readable storage medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A method implemented by a host server, comprising:
receiving, at the host server, a first message sent via a first network from a first mobile client device of a first customer, the first message indicative of a request for check-in at a merchant facility at which the first customer is engaged in a pre-sale transaction, wherein the request for check-in is sent by the first customer from an app executing at the first mobile client device, wherein the request for check-in is verified based on location data generated by the first mobile client device;

based on the first message, identifying, by the host server, a point-of-sale (POS) device in proximity to the first mobile client device at the merchant facility based on the location data;

accessing, via a second network and from the POS device, real-time pre-sale transaction data associated with the pre-sale transaction;

transmitting, by the host server via the first network to the first mobile client device, a promotion that improves business associated with the merchant facility, wherein the promotion is based on the pre-sale transaction data;

processing, by the host server, the request for check-in to update a status of the first customer in a set of social networks of the first customer, the status indicating that the first customer has checked-in at the merchant facility, the processing including sending a check-in notification via a third network to a set of social networking servers associated with the set of social networks to update the status;

receiving, at the host server, an order request via a fourth network from a second mobile client device of a second customer, the order request for an item of goods and/or services associated with the real-time pre-sale transaction data, wherein the second customer has been notified of the real-time pre-sale transaction data based on the check-in notification transmitted to the set of social networking servers;

transmitting, by the host server via the first network, to the first mobile client device of the first customer, a second message indicative of a prompt for approval by the first customer of the order request; and wherein in response to receipt of approval from the first mobile client device, transmitting, by the host server system, the order request, via the second network to the POS device at the merchant facility, for fulfillment by the merchant facility.

2. The method of claim 1, further comprising:
identifying, by the host server, the set of social networks of the first customer based on the request for check-in received from the first mobile client device; and
wherein the check-in notification is transmitted to the set of social networking servers based on the identified set of social networks.

3. The method of claim 1, further comprising:
transmitting, by the host server, the real-time pre-sale transaction data associated with the first customer to the first mobile client device for display to the first customer.

4. The method of claim 1 further comprising:
authenticating, by the host server, the request to check-in using data associated with the first mobile client device; and
in response to successful authentication, sending, by the host server via the first network, a confirmation to the first mobile client device.

5. The method of claim 1, wherein the order request comprises any one of:
a request to pay for the item of goods and/or services at the merchant facility on behalf of the first customer; or
a request to order a new item of goods and/or services at the merchant facility on behalf of the first customer.

6. The method of claim 1, wherein the real-time pre-sale transaction data comprises an itemized bill.

7. The method of claim 1, wherein the merchant facility is a point of interest, and wherein the item of goods and/or services comprises any of an admission ticket or a souvenir.

8. A host server system, comprising:
a memory;
a processor coupled to the memory and configured to:
receive a first message from a first mobile client device of a first customer, the first message indicative of a request for check-in at a merchant facility at which the first customer is engaged in a pre-sale transaction, wherein the request for check-in is sent by the first customer from an app executing at the first mobile client device, wherein the request for check-in is verified based on location data generated by the first mobile client device;
authenticate the request to check-in using the location data generated by the first mobile client device;
transmit, by the host server via the first network to the first mobile client device, a promotion that improves business associated with the merchant facility, wherein the promotion is based on the pre-sale transaction data;
process the request for check-in to update a status of the first customer in a set of social networks of the first customer, the status indicating that the first customer has checked-in at the merchant facility, the processing including sending a check-in notification, the process including sending a check-in notification to a set of social networking servers associated with the set of social networks;
receive an order request from a second mobile client device of a second customer, the order request for an item of goods and/or services associated with the real-time pre-sale transaction data, wherein the second customer has been notified of the real-time pre-sale transaction data based on the check-in notification transmitted to the set of social networking servers;
transmit, by the host server via the first network, to the first mobile client device of the first customer, a second message indicative of a prompt for approval by the first customer of the order request; and
wherein in response to receipt of approval from the first mobile client device, transmit the order request to the POS device at the merchant facility, the order request for fulfillment by the merchant facility.

9. The host server system of claim 8, wherein the processor is further configured to:
based on the first message, identify a point-of-sale (POS) device in proximity to the first mobile client device at the merchant facility;
access, from the POS device, real-time pre-sale transaction data associated with the pre-sale transaction; and
transmit the real-time pre-sale transaction data associated with the first customer to the first mobile client device for display to the first customer.

10. The host server system of claim 8, wherein the processor is further configured to:
receive a payment instruction from the first mobile client device; and
process the payment instruction to facilitate payment of the transaction.

11. The host server system of claim 8, wherein the processor is further configured to:

receive a payment instruction from the second mobile client device; and process the payment instruction to facilitate payment of the order request.

12. The host server system of claim 8, wherein the processor is further configured to:

receive an order instruction from the first mobile client device; and process the order instruction to modify the real-time pre-sale transaction data associated with the first customer.

13. The method of claim 1, wherein the order request comprises any one of:

a request to pay for the item of goods and/or services at the merchant facility on behalf of the first customer; or a request to order a new item of goods and/or services at the merchant facility on behalf of the first customer.

14. A non-transitory computer-readable medium storing computer-executable instructions for implementing a method, comprising:

instructions for receiving, from a first mobile client device of a first customer, a request to access real-time pre-sale transaction data associated with a pre-sale transaction between the first customer and a merchant at a merchant facility associated with the merchant;

instructions for, based on the request, accessing the real-time pre-sale transaction data associated with the first customer from a point of sale device located proximate the first mobile client device at the merchant facility, wherein proximity of the first mobile client device to the point of sale device is verified based on location data generated by the first mobile client device;

instructions for transmitting to the first mobile client device, a promotion that improves business associated with the merchant facility, wherein the promotion is based on the pre-sale transaction data;

instructions for, transmitting, at the management system, the real-time pre-sale transaction data associated with the first customer to the first mobile client device for display to the first customer;

instructions for receiving an order instruction from the first mobile client device to modify the real-time pre-sale transaction data associated with the first customer;

instructions for transmitting, at the management system, to the first mobile client device of the first customer, a second message indicative of a prompt for approval by the first customer of the order request; and wherein in response to receipt of approval from the first mobile client device, instructions for processing the order instruction based on the order instruction.

15. The non-transitory computer-readable medium of claim 14, wherein the instructions further comprise:

instructions for receiving a first message sent from the first mobile client device, the first message indicative of a request for check-in at a merchant facility at which the first customer is engaged in the pre-sale transaction;

instructions for authenticating the request to check-in using data associated with the first mobile client device; and instructions for, in response to successful authentication, sending a confirmation to the first mobile client device.

16. The non-transitory computer-readable medium of claim 15, wherein the instructions further comprise:

instructions for transmitting a second message to a set of social networking servers associated with a set of social networks of the first customer, the second message indicative of a check-in notification to the set of social networks that the first customer has checked-in at the merchant facility;

instructions for receiving a third message from a second mobile client device of a second customer, the third message indicative of an order request for an item of goods and/or services associated with the real-time pre-sale transaction data, wherein the second customer has been notified of the real-time pre-sale transaction data based on the second message transmitted to the set of social networking servers; and instructions for transmitting a fourth message to the POS device at the merchant facility, the fourth message indicative of the order request for fulfillment by the merchant facility.

* * * * *